(12) United States Patent
Kindo et al.

(10) Patent No.: US 8,086,402 B2
(45) Date of Patent: *Dec. 27, 2011

(54) MAP DISPLAYING DEVICE

(75) Inventors: Tsuyoshi Kindo, Osaka (JP); Takahiro Kudoh, Kyoto (JP); Takashi Akita, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/088,524

(22) Filed: Apr. 18, 2011

(65) Prior Publication Data

US 2011/0196604 A1   Aug. 11, 2011

Related U.S. Application Data

(63) Continuation of application No. 12/065,364, filed as application No. PCT/JP2006/318001 on Sep. 11, 2006, now Pat. No. 7,962,280.

(30) Foreign Application Priority Data

Sep. 12, 2005 (JP) .................................. 2005-263403
Apr. 17, 2006 (JP) .................................. 2006-113168

(51) Int. Cl.
*G01C 21/30* (2006.01)

(52) U.S. Cl. .......... 701/208; 701/66; 701/211; 701/212; 340/995.15

(58) Field of Classification Search .................... 701/66, 701/206, 208, 209, 211, 212; 340/995.14, 340/995.15, 995.16, 995.17, 995.26, 995.27
See application file for complete search history.

(56) References Cited

U.S. PATENT DOCUMENTS

| | | | |
|---|---|---|---|
| 5,568,390 A | 10/1996 | Hirota et al. | |
| 2001/0020211 A1* | 9/2001 | Takayama et al. | 701/200 |
| 2003/0023372 A1* | 1/2003 | Chon | 701/211 |

FOREIGN PATENT DOCUMENTS

| | | |
|---|---|---|
| JP | 02-032213 | 2/1990 |
| JP | 2-103584 | 4/1990 |
| JP | 09-138133 | 5/1997 |
| JP | 09-244527 | 9/1997 |
| JP | 10-260053 | 9/1998 |
| JP | 11-016094 | 1/1999 |
| JP | 2000-283774 | 10/2000 |
| JP | 2001-125955 | 5/2001 |

(Continued)

OTHER PUBLICATIONS

International Search Report issued Nov. 14, 2006 in International (PCT) Application No. PCT/JP2006/318001.

(Continued)

*Primary Examiner* — Gertrude Arthur Jeanglaude
(74) *Attorney, Agent, or Firm* — Wenderoth, Lind & Ponack, L.L.P.

(57) ABSTRACT

A map displaying device for displaying an accessible range in an arbitrary display form determined in accordance with the scale of a displayed map and/or with the running state of a vehicle is provided. The map displaying device includes: a display unit for displaying map information stored in a map database; a search unit for calculating travel time information regarding a travel time to an arbitrary point accessible from a reference point; and a time information drawing unit for displaying the travel time information in a superimposed manner on the display unit by varying a display form in accordance with the scale of a map and/or with the running state of a user's vehicle.

6 Claims, 30 Drawing Sheets

FOREIGN PATENT DOCUMENTS

| | | |
|---|---|---|
| JP | 3385657 | 1/2003 |
| JP | 2003-148977 | 5/2003 |
| JP | 2004-156982 | 6/2004 |

OTHER PUBLICATIONS

Gen'ichi Nakazawa et al., "Yuhaiso Keikaku Shien Simulation System no Kaihatsu to Tekiyo", Dai 10 Kai Gijitsu Kenkyu Happyo Ronbunshu 1999 Nen, The Urban Infrastructure & Technology Promotion Council, Feb. 2, 1999, pp. 139-144.

Shin Yoshikawa, "Introduction to Geo-informatics", Japan, Rikoh Tosho Co., Ltd, Sep. 20, 2002, First Edition, p. 126-127 (partial English language translation provided).

* cited by examiner

F I G. 3

(A) NODE DATA TABLE

| NODE ID | ATTRIBUTE | VALUE |
|---|---|---|
| N1 | LATITUDE | N34° 44' 30" |
| | LONGITUDE | E135° 34' 25" |
| | NUMBER OF CONNECTED LINKS | 4 |
| | CONNECTED LINK ID | L1, L3, L8, L12 |
| ... | ... | ... |

(B) LINK DATA TABLE

| LINK ID | ATTRIBUTE | VALUE |
|---|---|---|
| L1 | STARTING-POINT NODE ID | N1 |
| | END-POINT NODE ID | N5 |
| | LINK LENGTH | 300 |
| | LINK WIDTH | 15 |
| | ROAD TYPE | 4 (REFER TO RODE-TYPE DATA TABLE) |
| ... | ... | ... |

(C) RODE-TYPE DATA TABLE

| ATTRIBUTE | VALUE |
|---|---|
| 1ST CLASS ROAD | 0 |
| 2ND CLASS ROAD | 1 |
| 3RD CLASS ROAD | 2 |
| 4TH CLASS ROAD | 3 |
| 5TH CLASS ROAD | 4 |
| 6TH CLASS ROAD | 5 |
| 7TH CLASS ROAD | 6 |

FIG. 5

| SCALE | First class road | second class road | third class road | fourth class road | fifth class road | sixth class road | seventh class road |
|---|---|---|---|---|---|---|---|
| 10m | DISPLAYED | DISPLAYED | DISPLAYED | DISPLAYED | DISPLAYED | DISPLAYED | DISPLAYED |
| 25m | DISPLAYED | DISPLAYED | DISPLAYED | DISPLAYED | DISPLAYED | DISPLAYED | DISPLAYED |
| 100m | DISPLAYED | DISPLAYED | DISPLAYED | DISPLAYED | DISPLAYED | DISPLAYED | DISPLAYED |
| 200m | DISPLAYED | DISPLAYED | DISPLAYED | DISPLAYED | DISPLAYED | DISPLAYED | DISPLAYED |
| 400m | DISPLAYED | DISPLAYED | DISPLAYED | DISPLAYED | DISPLAYED | DISPLAYED | DISPLAYED |
| 800m | DISPLAYED | DISPLAYED | DISPLAYED | DISPLAYED | DISPLAYED | DISPLAYED | NOT DISPLAYED |
| 1.6km | DISPLAYED | DISPLAYED | DISPLAYED | DISPLAYED | DISPLAYED | NOT DISPLAYED | NOT DISPLAYED |
| 3.2km | DISPLAYED | DISPLAYED | DISPLAYED | DISPLAYED | NOT DISPLAYED | NOT DISPLAYED | NOT DISPLAYED |
| 6.4km | DISPLAYED | DISPLAYED | NOT DISPLAYED | NOT DISPLAYED | NOT DISPLAYED | NOT DISPLAYED | NOT DISPLAYED |
| 12km | DISPLAYED | DISPLAYED | NOT DISPLAYED | NOT DISPLAYED | NOT DISPLAYED | NOT DISPLAYED | NOT DISPLAYED |
| 25km | DISPLAYED | NOT DISPLAYED | NOT DISPLAYED | NOT DISPLAYED | NOT DISPLAYED | NOT DISPLAYED | NOT DISPLAYED |
| 50km | DISPLAYED | NOT DISPLAYED | NOT DISPLAYED | NOT DISPLAYED | NOT DISPLAYED | NOT DISPLAYED | NOT DISPLAYED |

FIG. 23
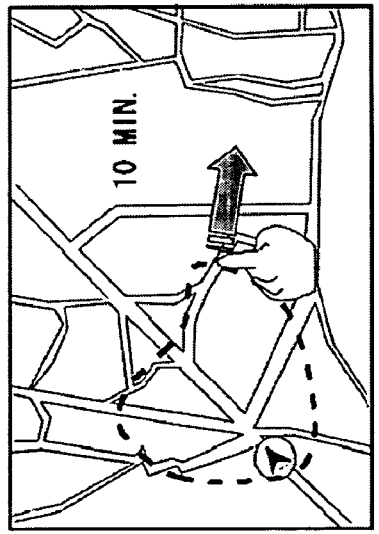
(A)
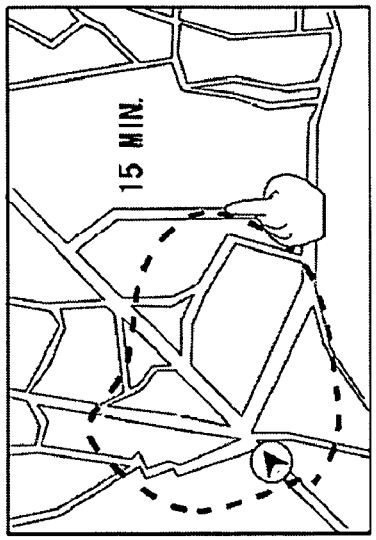
(B)
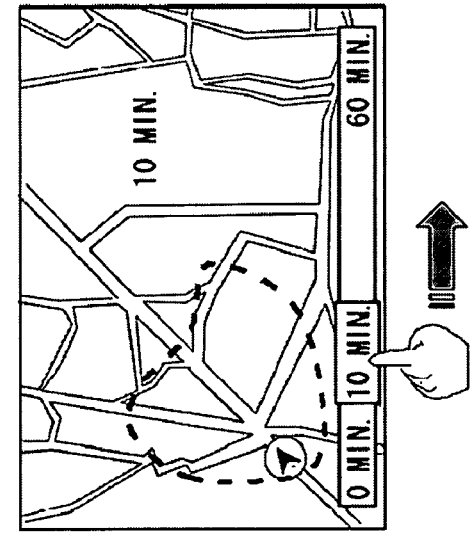
(C)
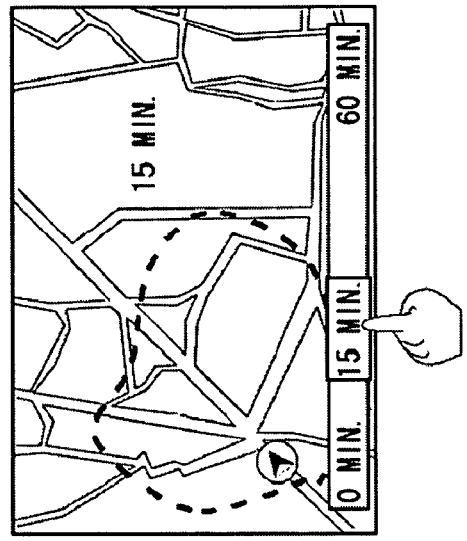
(D)

MAP DISPLAYING DEVICE

This application is a continuation of application Ser. No. 12/065,364, filed Feb. 29, 2008, now U.S. Pat. No. 7,962,280, which is the National Stage of International Application No. PCT/JP2006/318001, filed Sep. 11, 2006.

TECHNICAL FIELD

The present invention relates to a map displaying device, and particularly to a map displaying device for displaying an accessible range, accessible within an arbitrary time determined in accordance with the scale of a displayed map and/or with the running state of a user's vehicle.

BACKGROUND ART

In recent years, a navigation device capable of displaying, based on map information stored in an HDD or a DVD, a map of the neighborhood of the position of a user's vehicle or a map of the vicinity of a predetermined position, along with landmarks, traffic information, and the like on a display of the device is widely used. In such a navigation device, when a user sets a destination, a search is performed for an appropriate route to the destination and also the travel time for the travel is calculated, whereby it is possible to present the resultant information to the user.

In such a navigation device, a technique is proposed for displaying, on an optimal scale, a map which displays accessible positions, accessible in all directions from the current position within a time set by a user (see Patent Document 1, for example).

Further, in an accessible range displaying device used for a car allocation/command system of a taxi, a security company or the like, a technique is proposed for displaying a range accessible from the current position within a certain amount of time, by drawing a smooth curve around the range in an amoeba-like manner (see Patent Document 2, for example).

Patent Document 1: Japanese Patent Publication No. 3385657

Patent Document 2: Japanese Laid-Open Patent Publication No. 11-16094

SUMMARY OF THE INVENTION

Problems to be Solved by the Invention

However, the navigation device disclosed in Patent Document 1 merely displays, on the optimal scale, an accessible range, accessible within a time set by the user, and cannot display an accessible range, accessible within an arbitrary time determined in accordance with the scale of a displayed map and/or with the running state of a user's vehicle.

Further, the accessible range displaying device disclosed in Patent Document 2 merely displays in an amoeba-like manner an accessible range, accessible within a certain amount of time, and cannot display an accessible range, accessible within an arbitrary time determined in accordance with the scale of a displayed map and/or with the running state of a vehicle.

The present invention is directed to solving the above problems. That is, an object of the present invention is to provide a map displaying device for displaying an accessible range in an arbitrary display form determined in accordance with the scale of a displayed map and/or with the running state of a vehicle.

Solution to the Problems

Aspects of the present invention are directed to a map displaying device. The present invention includes: display means for displaying map information stored in a map database; search means for calculating travel time information regarding a travel time to an arbitrary point accessible from a reference point; and time information drawing means for displaying, in a superimposed manner on a map displayed on the display means, the travel time information by varying a display form in accordance with a scale of the map and/or with a running state of a user's vehicle.

Further, it is preferable that search condition determining means for determining a search condition in accordance with the scale of the map, with the running state of the user's vehicle, and/or with user information is further included, and that the search means calculates, using the search condition determined by the search condition determining means, the travel time information regarding a travel time to an arbitrary point accessible from a reference point.

Further, it is preferable that the search condition is a search range, which is a range of points to which travel times are to be calculated, and/or road types to be used for a search.

Further, it is preferable that the time information drawing means displays the travel time information by connecting, by a line, points of the same travel time to one another or points of the same travel time period to one another.

Further, it is preferable that the time information drawing means displays the travel time information by dynamically changing the travel time information such that the number of the lines displayed on the display means is a constant number.

Further, it is preferable that the time information drawing means displays, as a zone, the travel time information indicating a range accessible within a certain travel time or within a certain travel time period.

Further, it is preferable that the time information drawing means displays, when displaying a plurality of the zones, the plurality of the zones by a gradation.

Further, it is preferable that the time information drawing means displays the travel time information by drawing a road and/or an intersection in various display forms in accordance with the travel time or a travel time period.

Further, it is preferable that the time information drawing means displays the travel time information by changing an interval between displayed travel times such that the wider the scale of the map is, the longer the interval is.

Further, it is preferable that the time information drawing means displays travel time information by changing an interval between displayed travel times or between displayed travel time periods such that the slower the traveling speed of the user's vehicle is, the longer the interval is.

Further, it is preferable that the time information drawing means displays the travel time information by sequentially drawing, in a radiating manner, travel times or travel time periods in accordance with large/small relationships among the travel times or among the travel time periods, respectively.

Further, it is preferable that the time information drawing means displays the travel time information by performing drawing effects different between the inside and the outside of a line indicating a predetermined travel time or of a zone indicating a predetermined travel time period.

Further, it is preferable that input means for inputting an instruction is further included, and that the travel time information specified by the input means is changed to the travel time information regarding a travel time or a travel time period determined in accordance with an instruction, inputted by the input means, to move an arbitrary point.

Further, it is preferable that the input means is a touch panel such that the time information drawing means displays the travel time information specified by the touch panel, as the travel time information regarding a travel time or a travel time period determined in accordance with a pressed position moving across the touch panel.

Further, it is preferable that a slider bar capable of changing the displayed travel time information is displayed on the display means, and that the time information drawing means displays the travel time information determined in accordance with a setting, set by the input means, of the slider bar.

Further, it is preferable that drawing/updating means for drawing/updating the travel time information drawn by the time information drawing means is further included, and that drawing/updating is performed at timing at which the drawing/updating means the position of the user's vehicle has passed through a node, at timing at which a predetermined time has passed, and/or at timing at which traffic congestion information has been received.

Further, it is preferable that display controlling means for controlling arrow display indicating traffic congestion occurring on a road is further included, and that while the time information drawing means is displaying the time information in a superimposed manner, the display controlling means controls the arrow display indicating traffic congestion occurring on a road.

Further, it is preferable that further included are: input means for receiving an input of a POI (point-of-interest) search condition to be used to perform a search for POI; recommended POI extracting means for extracting, based on the POI search condition received by the input means, one or more recommended POI in descending order of recommendation level; and recommended POI display means for displaying, with the travel time information drawn in a radiating manner by the time information drawing means, the one or more recommended POI in order of being extracted by the recommended POI extracting means.

Further, it is preferable that route blinking display means for displaying, in a blinking manner, a route to each of the recommended POI extracted by the recommended POI extracting means is further included.

Further, it is preferable that the recommended POI extracting means extracts one or more recommended POI in order of temporal proximity.

Further, it is preferable that the recommended POI extracting means extracts one or more recommended POI in ascending order of evaluation value obtained by performing weighted addition on a distance from a current position, a travel time from the current position, and/or a value obtained by quantifying a direction from the current position.

Further, it is preferable that access history storage means for storing access history of accessing POI is further included, and that the recommended POI extracting means extracts, with reference to the access history stored in the access history storage means, one or more recommended POI in descending order of frequency of access.

Effect of the Invention

As described above, according to the aspects of the present invention, it is possible to provide a map displaying device for displaying an accessible range in an arbitrary display form determined in accordance with the scale of a displayed map and/or with the running state of a vehicle.

That is, since the present invention displays, on an ordinary and familiar map, travel time information represented by the travel time to an arbitrary point and the travel time between arbitrary points, in accordance with the scale of the displayed map and with the running state of a vehicle, it is possible to present to a user a geographical distance and a temporal distance in an easily understandable manner.

Further, the present invention determines a search condition in accordance with the scale of the map, with the running state of a user's vehicle, and/or with user information, and displays, in a superimposed manner on the map, the travel time information regarding the travel times to points accessible from a reference point within a certain amount of time, by using the determined search condition. Thus, since it is possible to determine an appropriate range to search and a classification of road types even in a state where the user does not select only one destination, it is possible to reduce processing load generated by searching an unnecessary range. Thus, in addition, since the present invention displays information regarding the travel times to arbitrary points, in a display form based on the appropriate range to search and the classification of road types in a superimposed manner on the map representing the geographical distance, it is possible to appropriately present to the user the geographical distance and the temporal distance to each point.

Further, a navigation device currently in practical use displays traffic information, which is provided by floating car data, as color-coded arrows on roads. However, when in the future, detailed traffic information which is typified by floating car data, Infrastructure and Transport and which includes narrow streets is available in a vehicle, the traffic information represented as local collections of arrows may produce a problem that a map displayed on a display screen is complicated and disorganized. According to the present invention, however, it is possible to solve a problem that a map displayed on a display screen is so complicated and disorganized as to confuse the user.

Further, since the present invention draws appropriate travel time information to indicate an appropriate accessible range in an appropriate display form in accordance with the scale of the map and/or with the running state of the user's vehicle, it is possible to appropriately present to the user the geographical distance and the temporal distance with high visibility.

Further, since the present invention performs a drawing effect of displaying the travel time information in a radiating manner, it is possible to present to the user the travel time information by a successive and small unit in an easily understandable manner.

Further, since the present invention draws/updates the travel time information at appropriate timing, it is possible to present to the user the travel time information in real time even while driving.

Further, the present invention can display the travel time information through input means such as a touch panel or a slider bar while a map displayed on the display screen is being viewed. Thus, since the present invention can specify the displayed travel time information by an intuitive operation through the touch panel and the like, and thus can fine-tune the displayed travel time information, it is possible to easily present to the user the travel time information with high visibility.

Further, since the present invention displays a recommended POI with the travel time information displayed in a radiating manner, it is possible to present to the user the travel time to the recommended POI in an easily understandable manner.

Further, since the present invention displays the route to the recommended POI in a blinking manner, it is possible to present to the user the route to travel in an easily understandable manner.

BRIEF DESCRIPTION OF THE DRAWINGS

FIG. 3 is a diagram showing tables stored in a map DB 101.

FIG. 5 is a table having stored therein, with respect to the scale of a map, information regarding road types to be used for map display.

FIG. 23 is: (A) a diagram showing a state where an isochronal line is specified; (B) a diagram showing a state where the isochronal line is slid and another isochronal line is displayed; (C) a diagram showing a state where an isochronal line of 10-minute travel time is displayed using a slider bar; and (D) a diagram showing a state where an isochronal line of 15-minute travel time is displayed using the slider bar.

Figure 1:
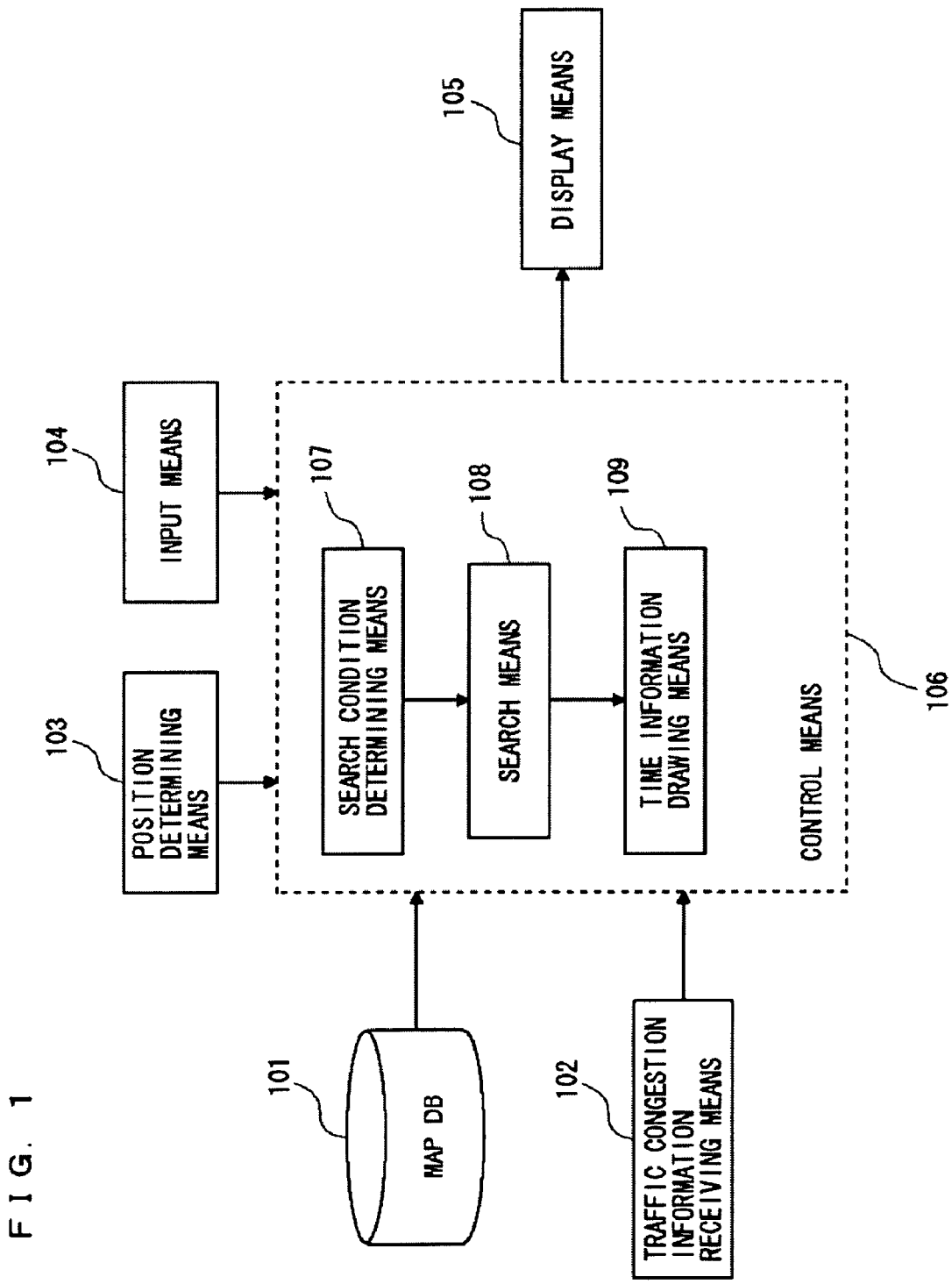
FIG. 1 is a block diagram showing a map displaying device according to an embodiment of the present invention.

DESCRIPTION OF THE REFERENCE CHARACTERS 101 map DB
102 traffic congestion information receiving means
103 position determining means
104 input means
105 display means
106 control means
107 search condition determining means
108 search means
109 time information drawing means
110 bearing mark
112 user's-vehicle-periphery equality range
113 traveling-direction-oriented range
114 traveling-road-type-oriented range
115, 116, 117, 118, 119, 120 closed curve

DETAILED DESCRIPTION OF THE INVENTION

With reference to the drawings, a map displaying device according to an embodiment of the present invention will be described below.

FIG. 1 shows a structure of the map displaying device according to the embodiment of the present invention. In the present embodiment, described is a case where the map displaying device is applied to a navigation device mounted on an automobile.

The map displaying device according to the present embodiment includes a map DB 101, traffic congestion information receiving means 102, position determining means 103, input means 104, display means 105, and control means 106.

The map DB 101 may be provided as, for example, an HDD or a DVD each having stored therein map information such as data of roads and intersections. The present invention, however, is not limited thereto, and information to be stored in the map DB 101 may be downloaded as needed from a traffic information center (not shown) by a communication device (e.g., a mobile phone and a PHS) not shown in the figures. Further, the map information may be acquired not by directly accessing the map DB 101 provided as the HDD or the DVD, but by referring to a memory which is provided in the map displaying device and into which necessary data of the data stored in the map DB 101 has been loaded in advance.

Figure 2:
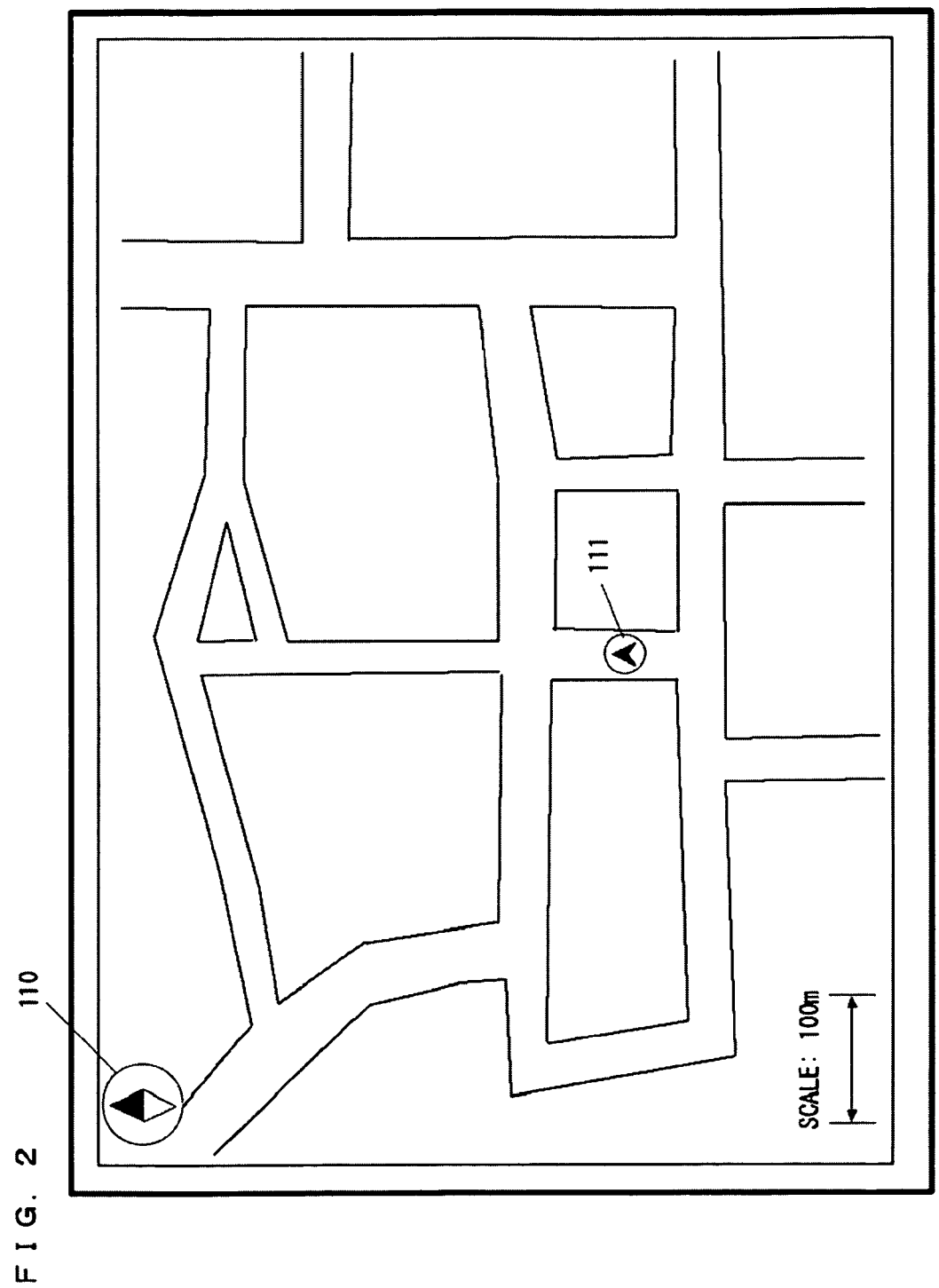
FIG. 2 is a diagram showing an example of a map presented to a user.

As shown in FIG. 2, a map is presented to a user by the display means 105 and represents information regarding a road width, a road direction, an angle at which roads intersect with each other, and the like. In FIG. 2, 110 is a mark indicating bearings and 111 is a mark indicating the position of a user's vehicle. Note that in general, not only the above-described road information but also background data (a river, a green space, etc.), POI information (e.g., landmark icons indicating a family restaurant, a gas station, etc.), menu buttons, and the like are presented to the user, but will not be described in the present embodiment.

As shown in FIG. 3, the road information is stored in the map DB 101, as a node data table (A), a link data table (B), and a road-type data table (C). A node stored in the node data table (A) is a point, such as an intersection and a junction, at which a road splits in several directions. The node includes position information such as latitude/longitude and also includes the number and link IDs of the below-described links connected to the node. A link stored in the link data table (B) represents a road connecting nodes to each other and includes IDs of a starting-point node and an end-point node which are the both ends of the link, a link length (in meters, kilometers, etc.), a link width (representing a road width in meters, etc.), and a road type. The link length is a reference for calculating the travel time to travel the road and is used as a cost value for performing a route search. Further, the value of the road type, which is one of the attributes of the link data table (B), can be identified by the road-type data table (C), in which road types such as a first class road (EXPRESS WAY, HIGHWAY) and a fifth class road (GENERAL ROAD) have values different from one another.

Figure 4:
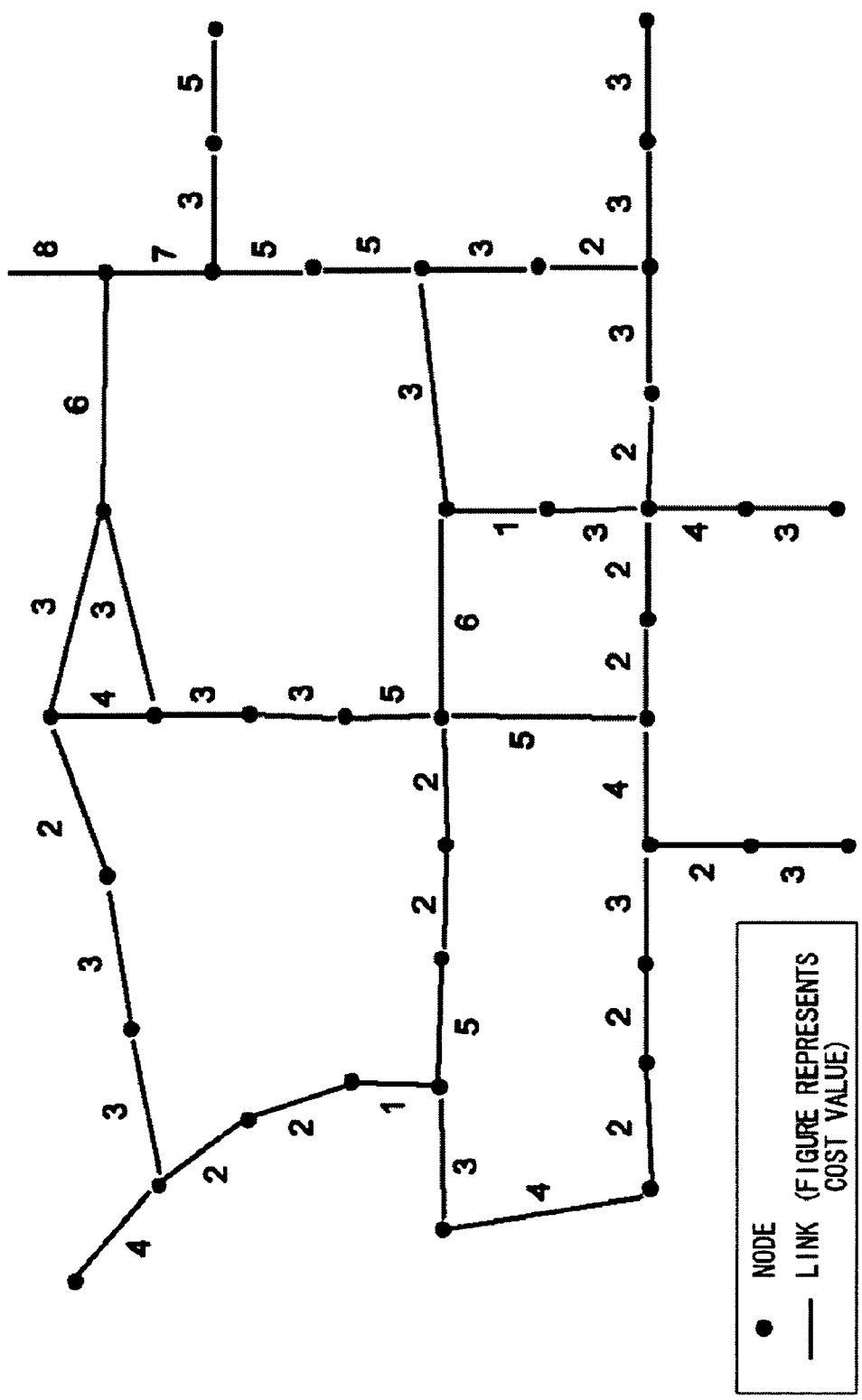
FIG. 4 is a diagram representing, by a network of nodes and links, roads included in a map.

FIG. 4 is a schematic diagram showing a state where the road information stored in the map DB 101 is constructed as a road network including nodes and links. The road network constructed as described above may be used, whereby it is possible to calculate the route and the travel time to a predetermined point by following the nodes and the links.

FIG. 5 is a table having stored therein, with respect to the scale of a map, information regarding road types used for map display, and the table is stored in the map DB 101. Note that the table may be stored in a memory not shown in the figures or the like. The table indicates that for example, when a map having the scale of 3.2 km is displayed, the links belonging to the road types including a first class road, a second class road (URBAN EXPRESSWAY), a third class road (MAJOR LOCAL ROAD), and a fourth class road (PREFECTURAI ROAD) are displayed on the display means 105, whereas the links belonging to the road types including a fifth class road, a sixth class road (SLIP LAMP), and a seventh class road (NARROW STREET) are not displayed on the display means 105.

The traffic congestion information receiving means 102 employs various devices in accordance with the type (floating car data, etc.) of traffic congestion information to be provided, and uses a receiving device compatible with an FM broadcast wave, an optical/radio beacon, a DSRC (Dedicated Short Range Communication) receiver, a mobile phone, and the like. The present invention is not limited thereto, and alternatively, the traffic congestion information may be received from a traffic congestion prediction database which is provided in the map DB 101 and has stored therein past traffic congestion statistical data (data based on a time of day, a day of the week, a date, and the like of the past). Note that traffic information is information indicating the travel time to pass through a section of the link length included in the link data table (B) and uses average speed data obtained in the section of the link length, and the like. The traffic congestion information may be used, whereby the travel time is determined with high accuracy, taking into account the degree of congestion.

The position determining means 103, attached to the vehicle on which the map displaying device is mounted, may be, for example, a GLASS (Global Navigation Satellite System) receiver, a vehicle speed sensor, a gyro (angular velocity) sensor, and an acceleration sensor, so as to measure the current position, the speed, and the direction of the vehicle. The GNSS receiver, which may be, for example, a GPS receiver, measures the absolute position of the receiver by demodulating radio waves received from a plurality of satellites. Note that in order to measure the current position, the speed, and the direction of the vehicle, the GNSS receiver and the aforementioned various sensors may be used separately or combined.

The input means 104 may include, for example, a device having arranged therein a predetermined number of press switches, a device of a touch-panel type, or a remote control, each of which receives an instruction from the user, or may include a microphone and a speech recognition engine, which recognize the voice of the user and convert the recognized voice into information to be inputted to the map displaying device.

The display means 105 may be, for example, a liquid crystal display, a plasma display, or an organic electroluminescent display, each displaying an image in accordance with display image data created by the control means 106.

Next, the control means 106 will be described. The control means 106 includes search condition determining means 107, search means 108, and time information drawing means 109. The control means 106 calculates the travel times for the user's vehicle to access a plurality of points provided in a predetermined map area and presents the calculated travel times on the display means 105. Each component will be described in detail below.

Based on the scale of the map, the running state of the vehicle, and/or user information, the search condition determining means 107 determines the range (i.e., a search range) of points to which the travel times are to be calculated, and the road types to be used for the search. In an ordinary navigation device, only the travel time to a destination specified by the user may be calculated and the search range may be set between the starting point and the endpoint (the destination) of the search. However, since the present embodiment is directed to a state where the user does not select only one destination, the search condition determining means 107 performs a function of determining an appropriate area to search. Basically, the search range to be extracted includes at least the map area displayed on the display means 105. Further, in the ordinary navigation device, the search is performed based on the road types specified by the user (for example, an input for avoiding highways or avoiding toll roads may be performed). However, since in the present embodiment, the map displaying device is required to operate in a state where the user does not set any destination, the map displaying device determines, taking the state into account on its own, the road types to be used.

Based on the search range and the road types which are determined by the search condition determining means 107, the search means 108 calculates the travel times to all possible points (routes) to travel from a reference point (hereinafter, the current position of the user's vehicle will be described as an example thereof) of the search start. The search method may employ the heretofore known Dijkstra algorithm, in which case, however, the below-described various improvements are necessary for calculating the travel times.

The time information drawing means 109 has: a function of determining, based on travel time information regarding the travel time to each point which is calculated by the search means 108, a drawing style of the travel time information, and of displaying the determined drawing style with the map information on the display means 105; a function of controlling a display form in accordance with the scale and the vehicle speed so as to improve the visibility of the displayed travel time information; a function of performing a drawing effect; a function of changing the travel time to an arbitrary travel time when receiving from the user an instruction to change the travel time; a function of performing drawing/updating; and/or a function of controlling arrow display indicating traffic congestion occurring on a road. As examples of the drawing style of the travel time information, the present embodiment illustrates the following three drawing styles:

(1) displaying the travel time information as a line connecting, to one another, points to which the travel times from the reference point are the same;

(2) displaying the travel time information as a zone collectively including points to which the travel times from the reference point are the same; and (3) displaying roads and/or intersections by varying the colors and the patterns thereof in accordance with the range of the travel times from the reference point.

Particularly, the drawing style of (1) will be hereinafter referred to as an isochronal line. Further, the drawing style of (2) will be hereinafter referred to as an isochronal zone. Note that it is preferable that the user can select a drawing style from the drawing styles (1) to (3), through a setting screen not shown in the figures.

Figure 6:
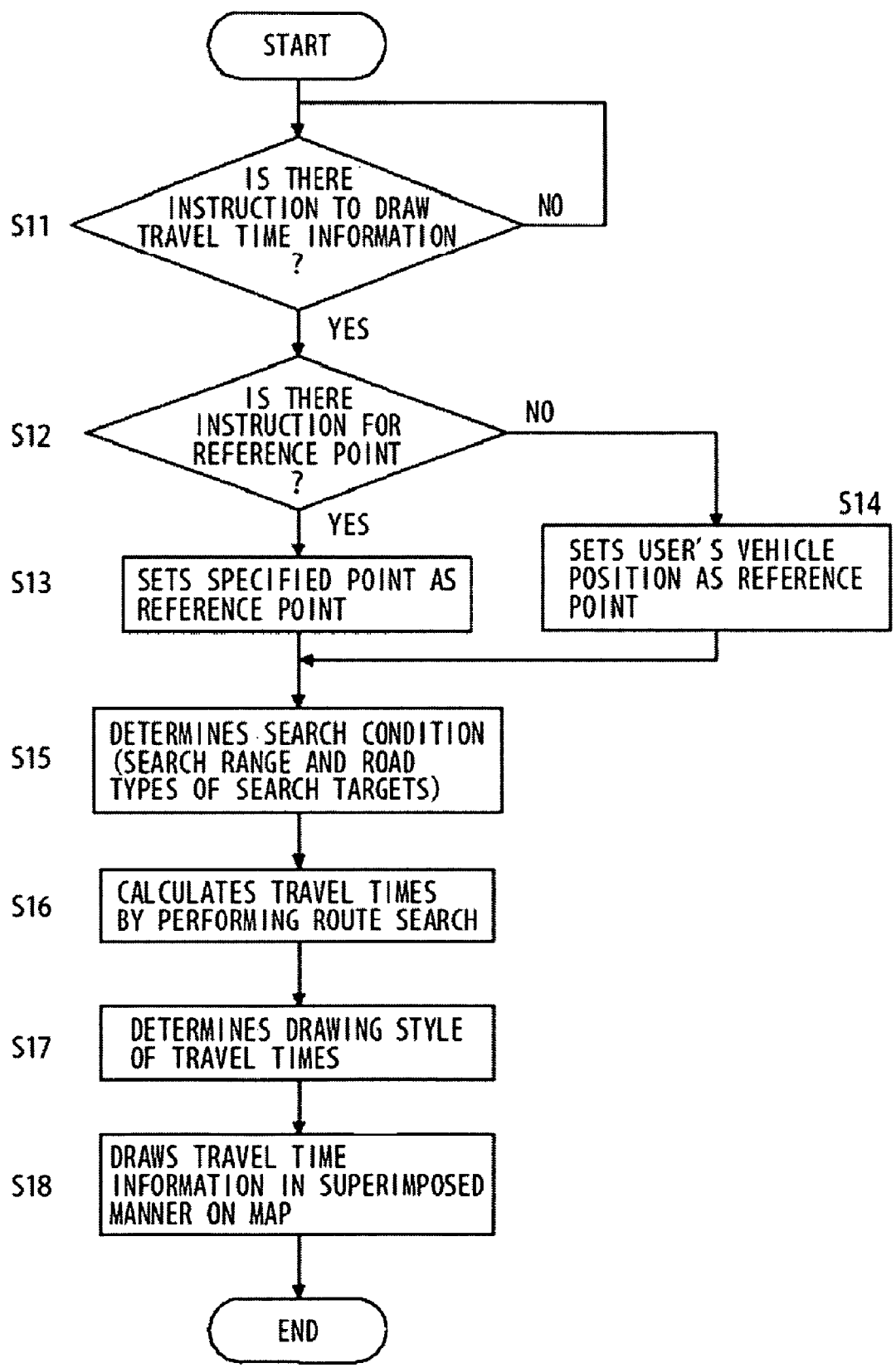
FIG. 6 is a flow chart showing the flow of a process performed by the map displaying device according to the embodiment of the present invention.

With reference to FIG. 6, the flow of the overall process performed in the map displaying device having the above structure will be described. FIG. 6 is a flow chart showing an operation performed until the travel time information is drawn in a superimposed manner on the map.

First, an instruction to draw the travel time information is received from the user through the input means 104 ("Yes" in step S11). Then, when an instruction to specify the reference point of the search start is received through the input means 104 ("Yes" in step S12), the control means 106 sets, with reference to the map DB 101, a specified point as the reference point (step S13). When the instruction to specify the reference point is not received ("No" in step S12), the control means 106 sets as the reference point of the search start a node or a link which is closest to the current position, detected by the position determining means 103, of the user's vehicle (step S14).

When the reference point is determined, the search condition determining means 107 of the control means 106 determines the search range, the road types to be used for the search, and the like, based on the scale of the map, the running state of the vehicle, the user information, and/or the like (step S15). When a search condition is determined, the search means 108 performs, using the determined road types, the route search for the routes to points provided within the search range determined based on the search condition, and calculates the travel times (step S16). Note that the search is performed for roads and intersections as search targets unless otherwise specified, and the search is also performed, when a particular category of POI or landmarks are specified by the user, for the specified particular category of POI or the specified landmarks.

When the search is completed, the time information drawing means 109 determines a drawing style of the travel time information to be drawn on the map (step S17). Then, the time information drawing means 109 performs functions, such as the function of controlling a display form in accordance with the scale so as to improve the visibility of the displayed travel time information and/or the function of performing a drawing effect, whereby the travel time information is drawn in a superimposed manner on the map displayed on the display means 105 (step S18).

Note that although in step S11, described is a case where the travel time information is drawn in a superimposed manner on the map only after the instruction is received from the user, the present invention is not limited thereto. The travel time information may be constantly drawn in a superimposed manner on the map when a destination is not set through the setting screen not shown in the figures.

Next, with reference to FIGS. 7 and 8, a detailed operation, performed by the search condition determining means 107, of determining the search condition in step S15 of FIG. 6 will be described.

Figure 7:
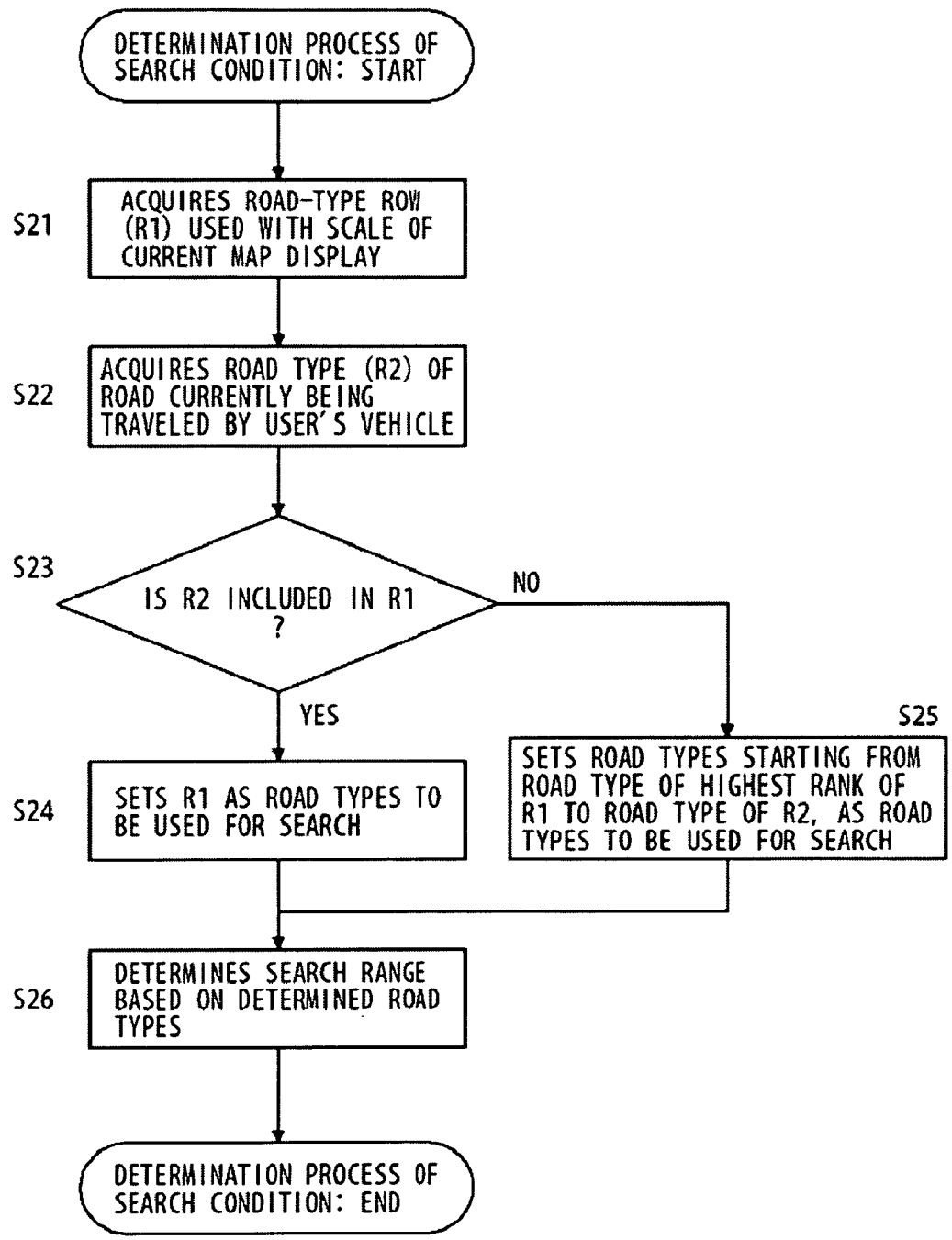
FIG. 7 is a flow chart showing a determination processing operation, performed by search condition determining means 107, of a first search condition.

FIG. 7 is a flow chart showing a determination processing operation, performed by the search condition determining means 107, of a first search condition. FIG. 7 will be described with reference to FIGS. 3 and 5. In the road-type data table (C) of FIG. 3, for convenience, the road types will be referred to in such a manner that the closer to the top of the table, the higher rank the road type is of. For example, the first class road is the road type of the highest rank.

First, a road-type row (hereinafter referred to as an R1) used with the scale of the current map display is acquired from the table of FIG. 5 (step S21). Then, the road type (hereinafter referred to as an R2) of the road currently being traveled by the user's vehicle is acquired based on a positioning result of the position determining means 103 (step S22). In step S23, it is determined whether or not the R2 is included in the R1. When the R2 is included in the R1 (step S23: "Yes"), the R1 is set as the road types to be used for the search (step S24). For example, in FIG. 5, when the scale is of 1.6 km and the road type of the road being traveled by the user's vehicle is the fifth class road, the R1 is the first class road, the second class road, the third class road, the fourth class road and the fifth class road, and the R2 is the fifth class road. In this case, the R1 is set as the road types to be used for the search. On the other hand, when the R2 is not included in the R1 (step S23: "No"), the road types starting from the road type of the highest rank of the R1 to the road type of the R2 are set as the road types to be used for the search (step S25). For example, in FIG. 5, when the scale is of 6.4 km and the road type of the road being traveled by the user's vehicle is the fifth class road, the R1 is the first class road, the second class road and the third class road, and the R2 is the fifth class road. In this case, the first class road, the second class road, the third class road, the fourth class road, and the fifth class road are set as the road types to be used for the search. Then, the search range is determined (step S26). As described above, when a wide-area map (having the scale of 400 m or more) is displayed on the display means 105 and the road type of the road being traveled by the user's vehicle is of a high rank (i.e., the road type is other than the seventh class road), seventh class roads are not to be displayed and are not the roads to be currently traveled, and therefore may be removed from the search targets. The search range is determined such that when the current average speed of the user's vehicle is, for example, 500 m/min. and the travel time to be obtained is, for example, 10 minutes and if the position of the user's vehicle is the point of the search start, all accessible points provided within a circle having a radius of 5000 m and having the position of the user's vehicle as its center are determined as the search range.

Figure 8:
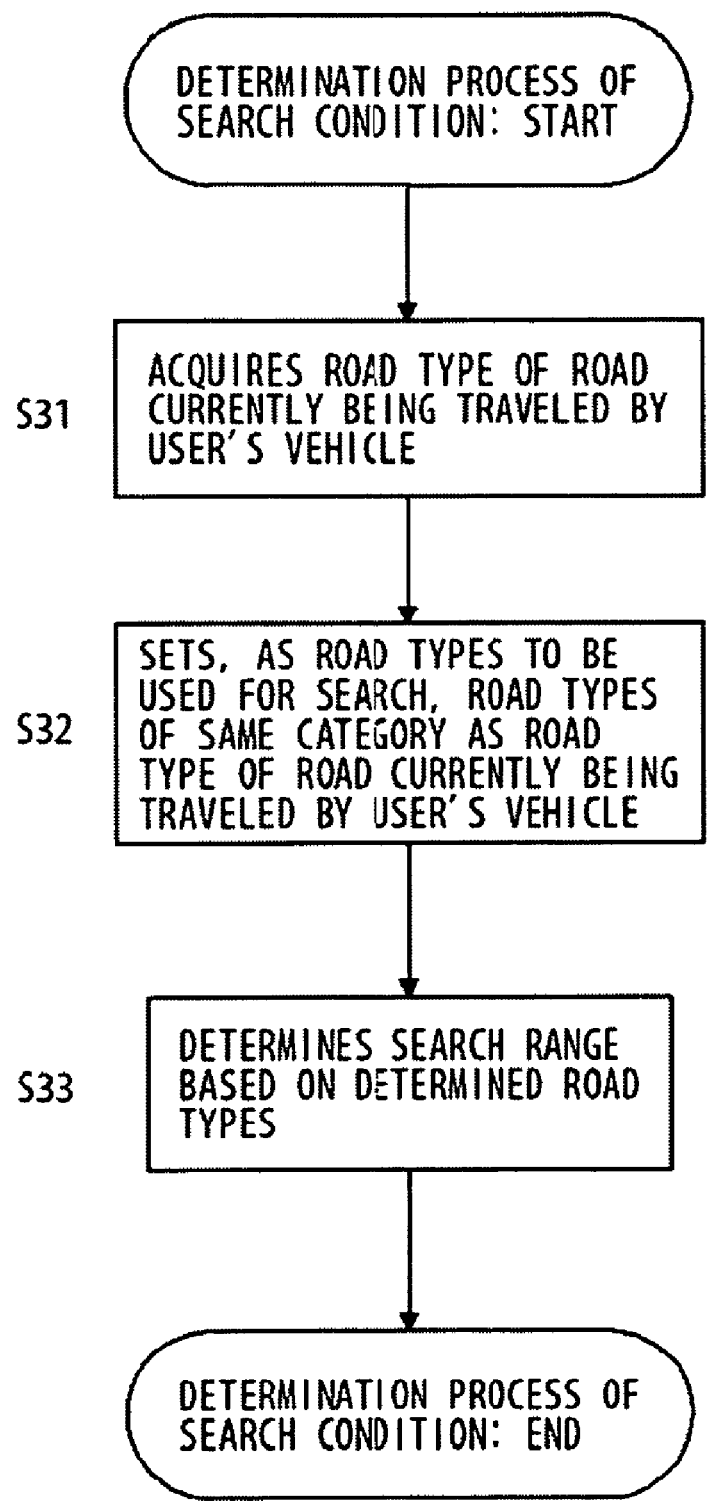
FIG. 8 is a flow chart showing a determination processing operation, performed by the search condition determining means 107, of a second search condition.

FIG. 8 is a flow chart showing a determination processing operation, performed by the search condition determining means 107, of a second search condition. FIG. 8 will be described with reference to FIG. 3. In the road-type data table (C) of FIG. 3, for convenience, the first class road and the second class road will be referred to as the road types of a first category, and the third class road, the fourth class road, the fifth class road, the sixth class road and the seventh class road will be referred to as the road types of a second category.

The road type of the road currently being traveled by the user's vehicle is acquired based on a positioning result of the position determining means 103 (step S31). Then, the road types of the same category as the road type of the road currently being traveled by the user's vehicle are set as the road types to be used for the search (step S32). For example, when the road type of the road currently being traveled by the user's vehicle is the second class road, the road types of the first category are the road types to be used for the search. Further, when the road type of the road currently being traveled by the user's vehicle is the fifth class road, the road types of the second category are the road types to be used for the search. Then, the search range is determined based on the determined road types (step S33). The search range may be determined such that for example, when the user's vehicle is traveling a road included in the road types of the first category, the distance between crossroads is large in general and accordingly, possible roads to be traveled by the user's vehicle are limited until the user's vehicle reaches a crossroads. Therefore, an area around the possible roads may be clearly extracted as the search range.

Note that the search condition determining means 107 may not determine the search range and the road types as described above, and the search condition determining means 107 may select roads to be search targets based on the user information. The user information may be, for example, information regarding the past travel history of the user and may be stored in storage means (a non-volatile memory) not shown in the figures. From the information regarding the past travel history, travel characteristics such as, "rarely travels a narrow street", "prefers to travel a wide road", or "usually travels certain routine roads when traveling in a predetermined direction", may be extracted, and then the search range and the road types may be determined based on the above characteristics.

Figure 9:
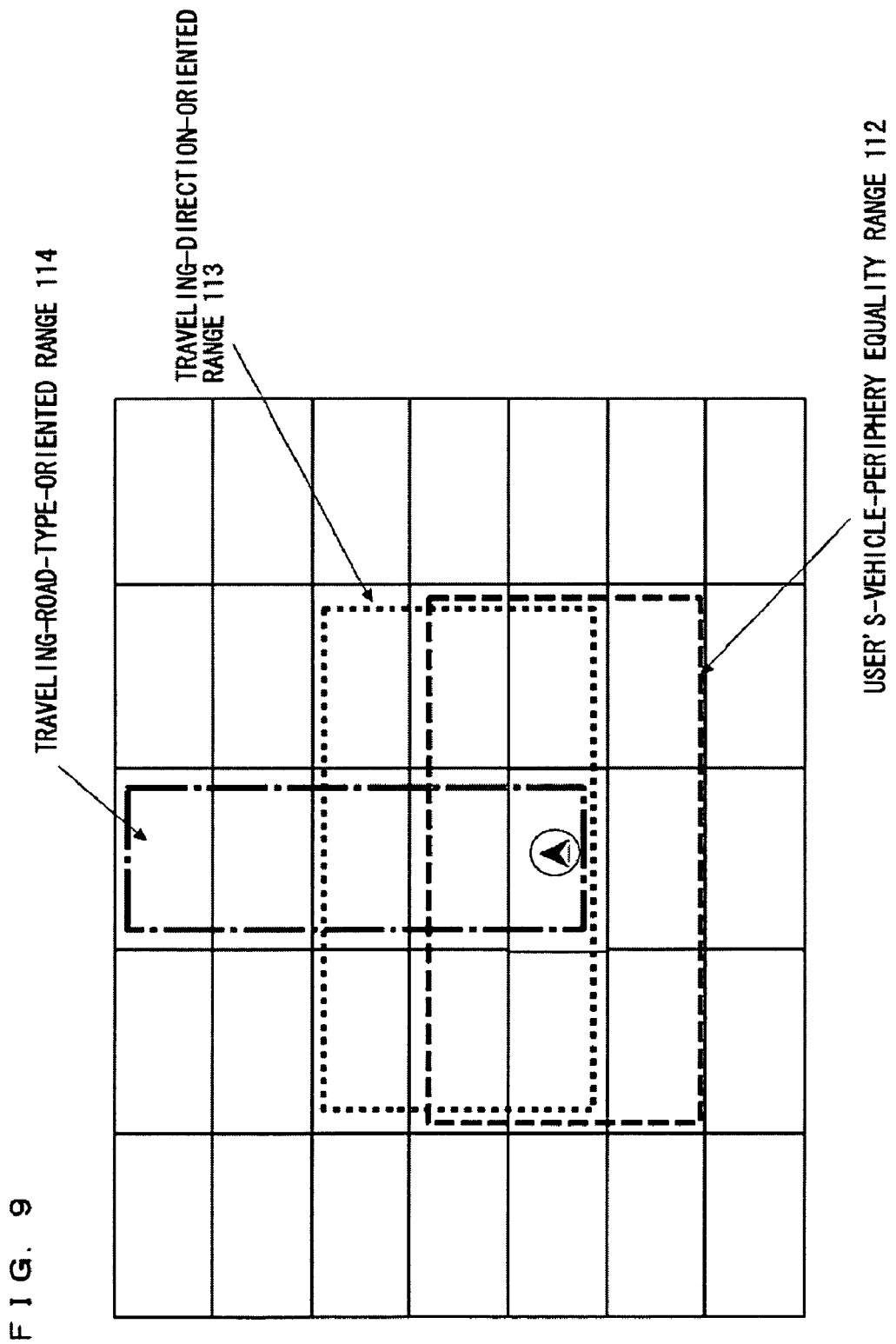
FIG. 9 is a conceptual diagram showing grids included in a map.

Further, the search condition determining means 107 may extract ranges as shown in FIG. 9. The map information, managed in a grid manner as shown therein, may be presented to the user, for example, on a grid basis. The user's-vehicle-periphery equality range 112 of FIG. 9 includes, as the search range, 9 grids having as its center a grid in which the user's vehicle is present and also having 8 grids therearound. The traveling-direction-oriented range 113 of FIG. 9 clearly includes, as the search range, an area provided in the traveling direction of the user's vehicle, that is, an area in which the map information and the travel time information are likely to be necessary hereafter. The traveling-road-type-oriented range 114 of FIG. 9 shows an example of the search range used in a case where the road being traveled by the user's vehicle is present from the position of the user's vehicle to the upper portion of the map. As described above, the search condition determining means 107 may set the position of the user's vehicle as the reference point of the search start, and may determine the search range in accordance with the grid in which the user's vehicle is present and with the state of the road network. Note that the shape of a grid may not necessarily be rectangular as shown in FIG. 9, and may be in any shape.

Although the operation, performed by the search condition determining means 107, of determining the search condition is described above, the present invention is not limited thereto. The search range may also be determined in accordance with the running state (the circumstances surrounding the travel of the user's vehicle, such as the position, the speed and the traveling direction of the user's vehicle, and the state of traffic congestion) of the user's vehicle and the like.

Note that the reference point is not limited to the current position of the user's vehicle, and when the user specifies a search start position in an explicit manner, the specified position may be the reference point.

Figure 10:
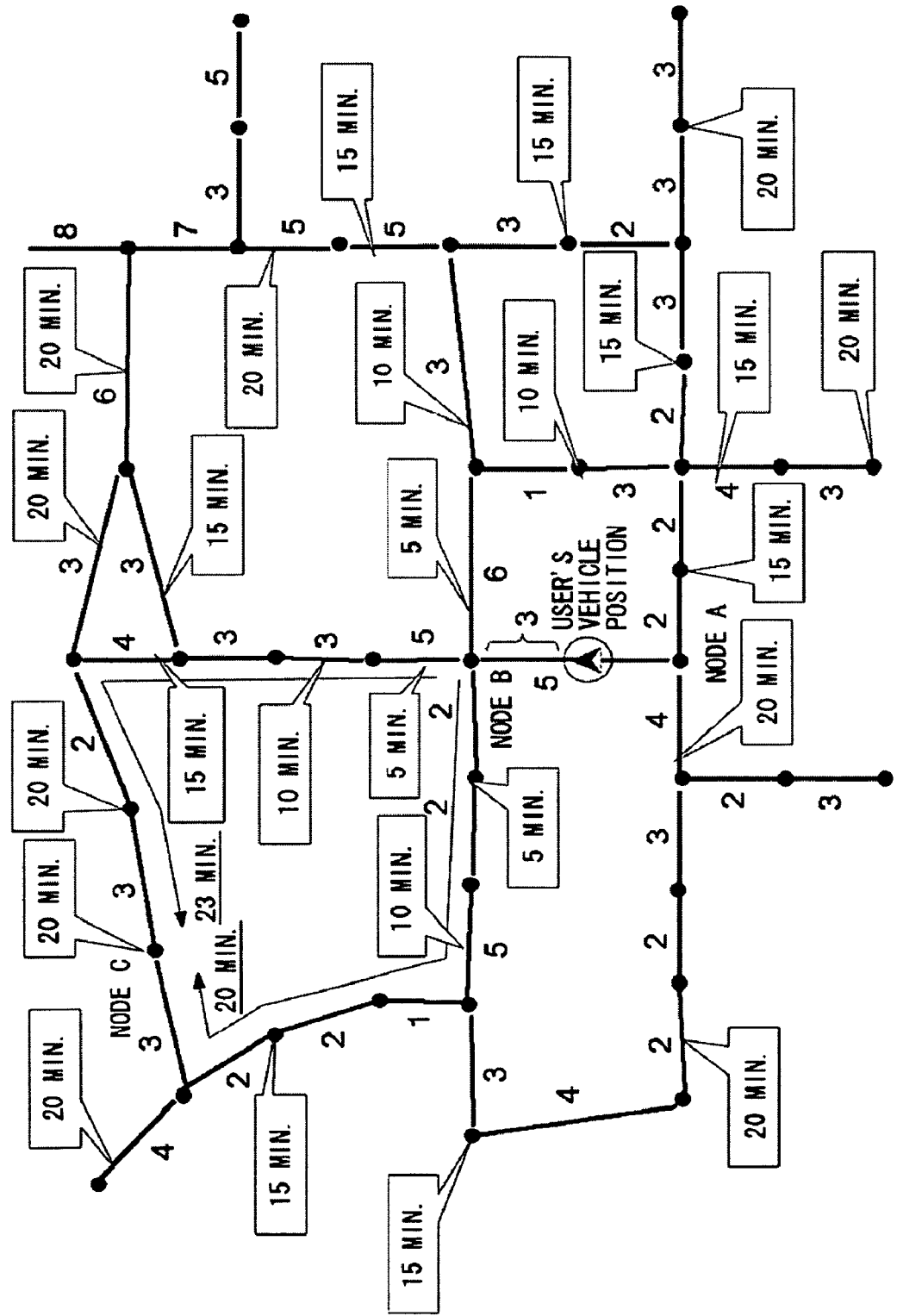
FIG. 10 is a diagram illustrating a calculation method of travel times.
Figure 11:
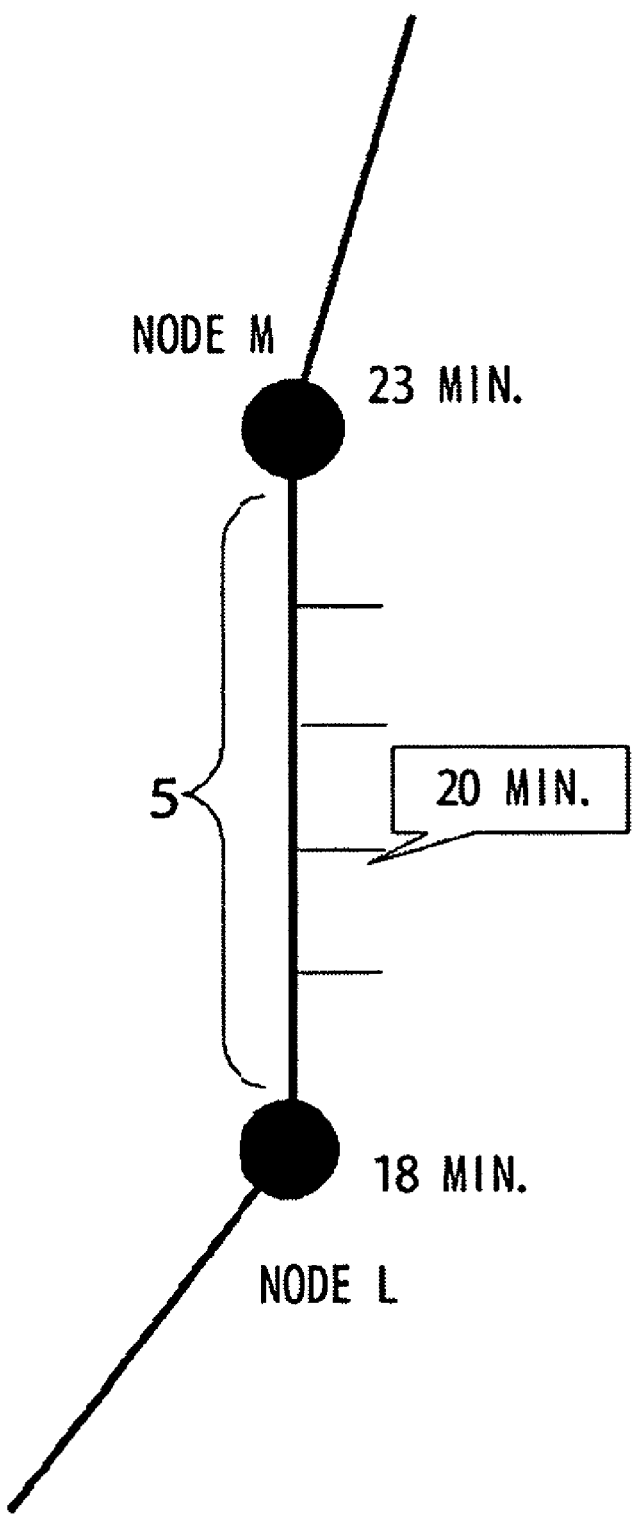
FIG. 11 is a diagram showing a calculation method of a travel time to a point provided on a link.

Next, with reference to FIGS. 10 and 11, an operation, performed by the search means 108, of calculating, based on the search range and the road types which are determined by the search condition determining means 107, the travel times to all possible points (routes) to travel from the reference point (hereinafter, the current position of the user's vehicle will be described as an example thereof) of the search start, will be described. Note that it is assumed that nodes and links of FIG. 10 have been extracted as the search range by the search condition determining means 107. Additionally, it is assumed that the current position of the user's vehicle is present at a point which is provided on a link (represented as a "link AB") connecting a node A to a node B and at which the cost from the node B is 3. In FIGS. 10 and 11, described is a case where the travel time to travel one section, which is allocated a cost of 3, is 3 minutes, for convenience.

Based on the position of the user's vehicle as the reference point, the search means 108 calculates the costs of all of the links provided in the range of FIG. 10. Note that a one-way road is not followed in a backward manner. The total cost between two points is represented by the sum of the costs of all of the links connecting the two points to each other. Based on all of the calculated costs, arbitrary points accessible from the position of the user's vehicle, for example, points of 5-minute travel time, 10-minute travel time, 15-minute travel time, and 20-minute travel time, each from the position of the user's vehicle, are extracted in FIG. 10.

The travel time from a node to another node is obtained by the sum of the costs of the links present therebetween, while the travel time to a point provided on a link is calculated by a method shown in FIG. 11. When the travel times from the position of the user's vehicle to a node L and a node M are 18 minutes and 23 minutes, respectively, and the cost of a link LM is 5, a point of 20-minute travel time can be viewed as a point corresponding to two-fifths of the link LM. Further, as with a node C of FIG. 10, there exist a large number of points each accessible via a plurality of routes, to which points the travel times vary depending on the route. In this case, as the travel time to the node C, a smaller value (20 minutes) is selected. Note that the travel times may be calculated with reference to the traffic congestion information, and consequently, it may take a shorter time to travel a longer distance route.

Although in the above example, described is a case where a point to which the travel time is calculated by the search means 108 is a node or a point provided on a link, an instruction may be received from the user through the input means 104. For example, when the user specifies "restaurants", the landmarks corresponding to the category "restaurants" may be extracted from the landmarks provided within the range extracted by the search condition determining means 107, and the travel times to the corresponding landmarks may be calculated.

Further, on the route for which the search is performed by the search means 108, turning of the vehicle at a point other than an intersection may be taken into account. In FIG. 10, for example, the user's vehicle present on the link AB may not be required to reach the node B by traveling the link from A to B, so as to turn, and may turn before reaching the node B and travel the link from B to A. Thus, the search may be performed, taking into account the above-described route.

Further, the reference point of the search start is not limited to the current position of the user's vehicle, and needless to say, an arbitrary point specified by the user can be set as the reference point.

Next, with reference to FIGS. 12 through 17, the function, performed by the time information drawing means 109, of determining a drawing style of the travel time information and of displaying the determined drawing style with the map information on the display means 105 will be described.

Figure 12:
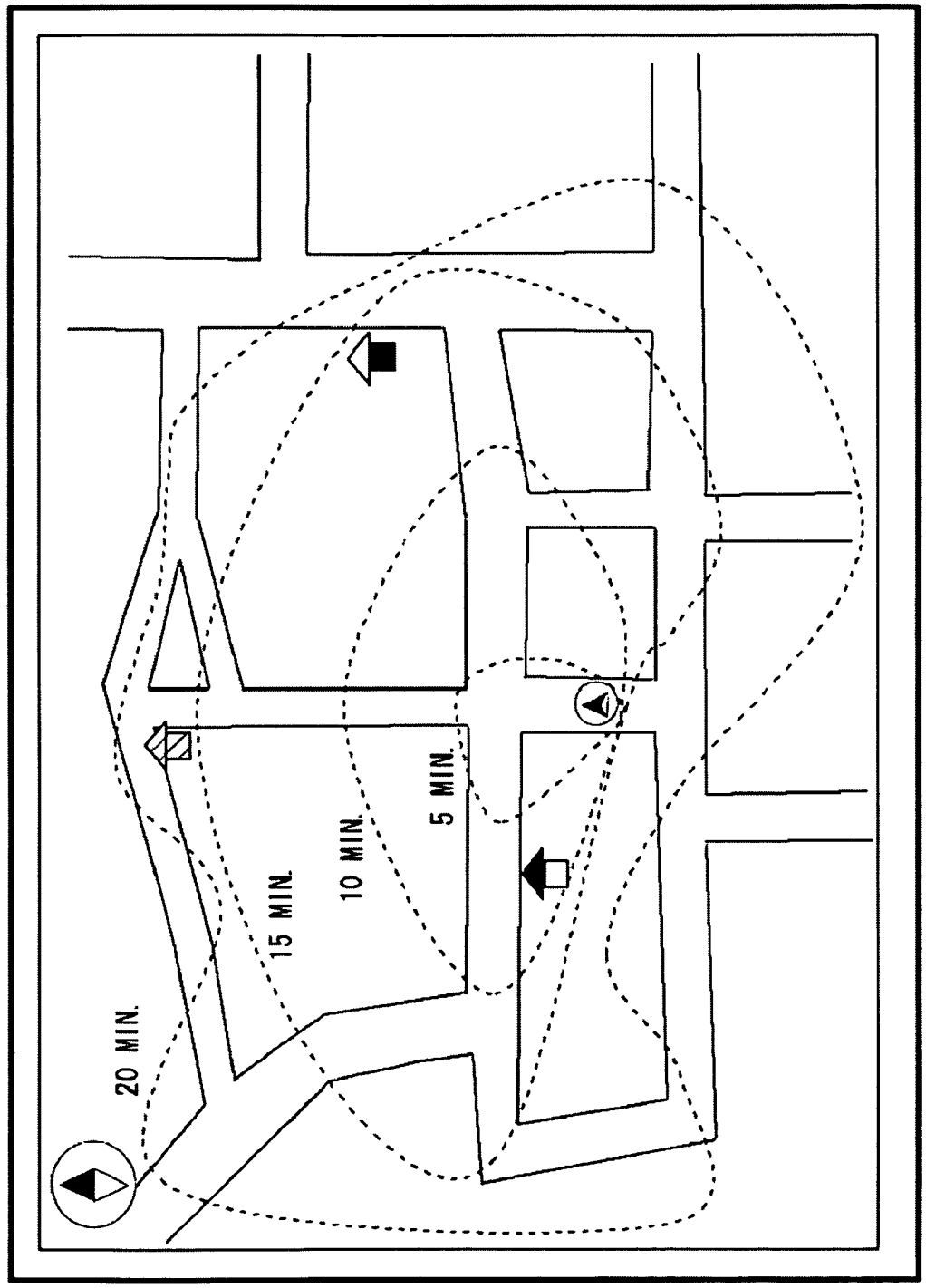
FIG. 12 is a diagram showing a state where isochronal lines, each connecting points of the same travel time to one another, are superimposed on a map.

FIG. 12 is a schematic diagram showing an example where isochronal lines of the drawing style (1) are drawn. The lines of FIG. 12 may be, for example, calculated and drawn based on a drawing method of the heretofore known Bezier curve as disclosed in Patent Document 2 or based on the below-described image processing. By the above-described process, points of 5-minute travel time, 10-minute travel time, and 20-minute travel time, each from the position of the user's vehicle which is determined as the reference point, are drawn as closed curves. Note that the lines may be drawn not only by the drawing method of the Bezier curve but also by that of the heretofore known spline curve and the like, and also may be drawn not only as closed curves but also as open curves or as straight lines.

The isochronal lines may be drawn as described above on an ordinarily displayed map, and thus the user can verify the distances to a plurality of landmarks provided on the map, on a distance basis, a time basis, and the like at the same time, and it is useful for determining a destination. Further, drawing/updating may be performed at the below-described timing, and thus it is possible to verify in real time the distance to a destination on a distance basis and a time basis even while the vehicle is running.

Further, points to be connected by an isochronal line of the Bezier curve and the like may belong to the same travel time period. When points provided on links as shown in FIG. 11 are removed from the targets and only nodes or only major intersections included therein are the targets to be connected to draw an isochronal line, the travel times may not necessarily be of convenient numbers such as 5 minutes and 20 minutes. In this case, the travel time period may have some range of the travel times, such as 5-to-10-minute time period and 10-to-15-minute time period, and accordingly, points of 12-minute travel time and 14-minute travel time may be considered to belong to the same 10-to-15-minute travel time period and may be connected to each other.

Figure 13:
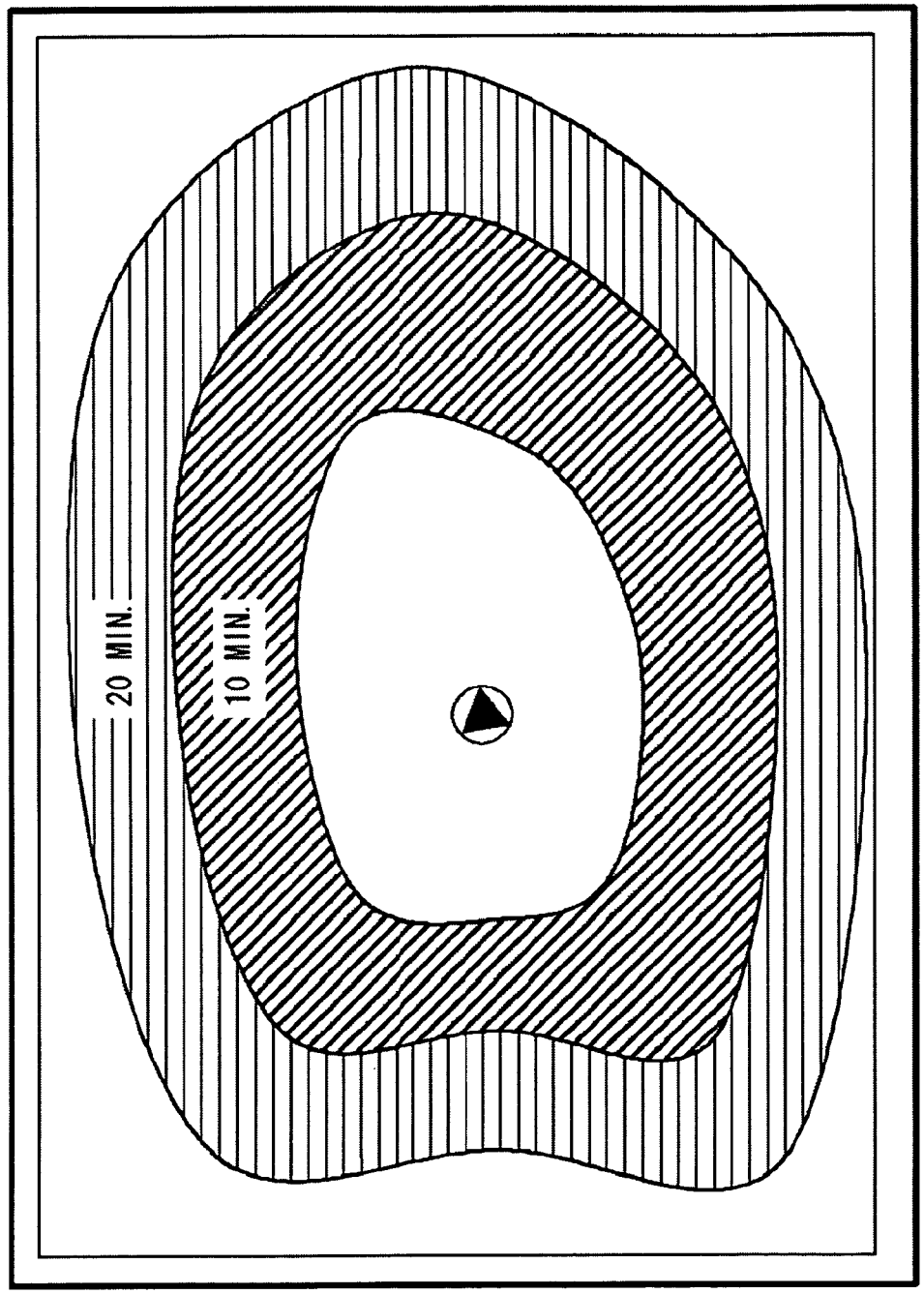
FIG. 13 is a diagram showing a state where, as zones, ranges accessible within certain travel times are superimposed on a map.

FIG. 13 is a schematic diagram showing an example where isochronal zones of the drawing style (2) are drawn. As shown in FIG. 13, ranges accessible within certain travel times are drawn as zones. The zones may be drawn as described above, and thus it is useful since it is possible to verify information regarding farthest points accessible from the position of the user's vehicle and least distant points only accessible from the position of the user's vehicle, each within a certain travel time, e.g., 10 minutes. Particularly, in a state where traffic congestion is locally occurring, the range of an isochronal zone tends to increase in width, and therefore produces an effect of notifying the user that it is better to set a destination than to travel without setting any destination. In this case, the user may be notified of a message for urging him/her to set a destination. In contrast, in a case where traffic congestion is not occurring, the range of an isochronal zone tends to decrease in width, and therefore the user can understand that it is only possible to access points having similar distances from the user within a certain amount of time even by selecting and traveling any roads.

Figure 14:
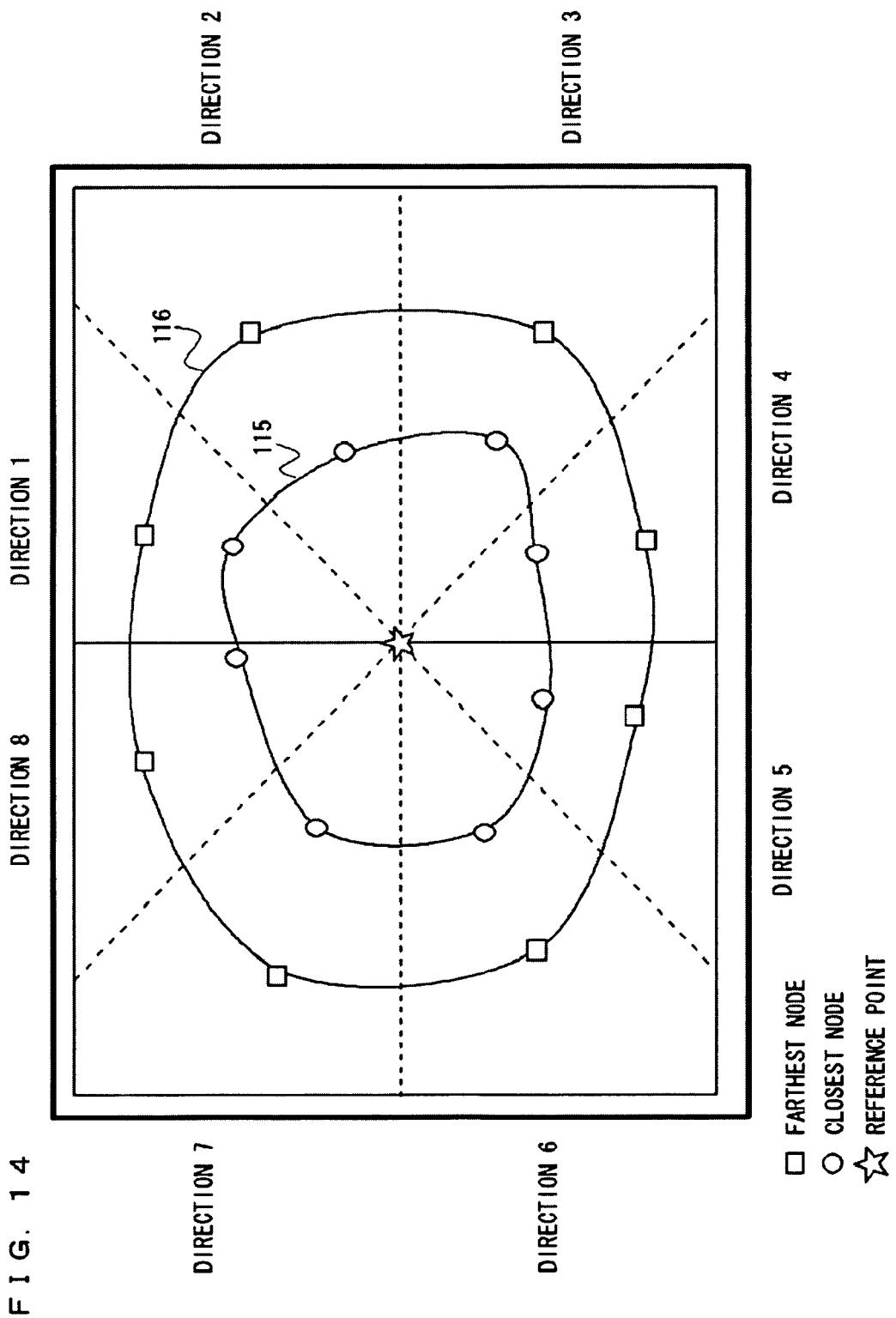
FIG. 14 is a diagram illustrating a drawing method of an isochronal zone.
Figure 15:
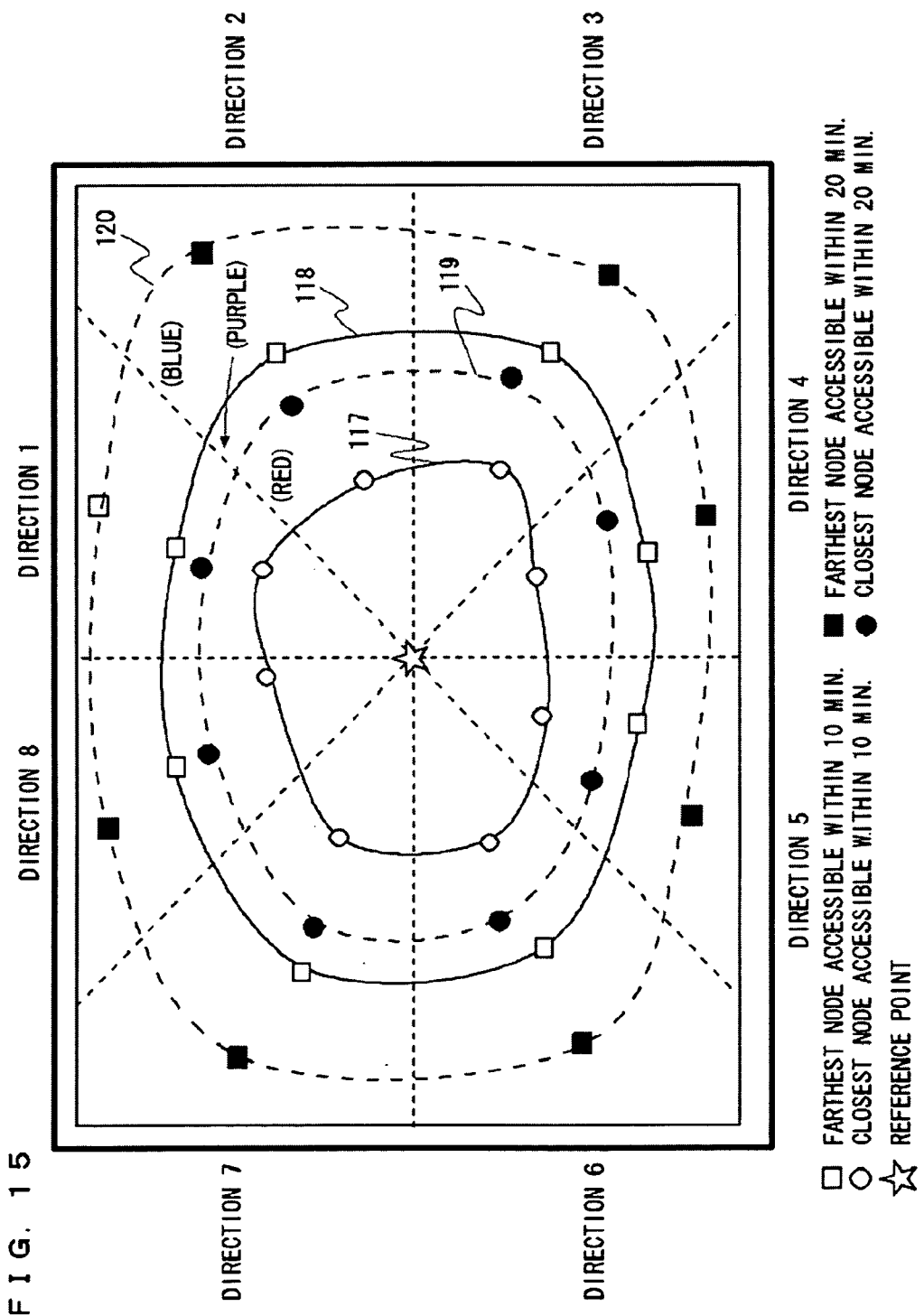
FIG. 15 is a schematic diagram illustrating a drawing method for drawing a plurality of isochronal zones.

Next, with reference to FIGS. 14 and 15, a method of drawing an isochronal zone will be specifically described. In FIG. 14, a symmetric map having as its center the position, represented as a star mark, of the user's vehicle is equally divided in m directions. Further, in each of the directions 1 through m, a node closest in a straight line from the position of the user's vehicle is represented as a circle, while a node farthest in a straight line therefrom is represented as a square. The search is performed for the circle and the square by the search means 108. Then, a closed curve 115 and a closed curve 116 are obtained by connecting the circles to one another and the squares to one another based on, for example, the drawing method of the heretofore known Bezier curve as disclosed in Patent Document 2. Then, an isochronal zone is drawn by filling an area between the curve 115 and the curve 116. Note that it is preferable that transparency processing is performed for the isochronal zone such that the map can also be viewed. Further, although in FIG. 14, m is set as 8, m may be changed to 4, 8, 16, 32, and the like, whereby the representational accuracy of an area accessible within a predetermined time may be changed.

FIG. 15 is a schematic diagram illustrating a drawing method for drawing a plurality of isochronal zones. Similarly to FIG. 14, a symmetric map having as its center the position, represented as a star mark, of the user's vehicle is equally divided in m directions. Further, in each of the directions 1 through m, nodes closest in a straight line from the position of the user's vehicle are represented as circles (a node of 10-minute travel time as an unfilled circle and a node of 20-minute travel time as a filled circle), while nodes farthest in a straight line therefrom are represented as squares (a node of 10-minute travel time as an unfilled square and a node of 20-minute travel time as a filled square). The circles and the squares are the search result obtained by the search means 108. Then, closed curves 117, 118, 119, and 120 are obtained by connecting the unfilled/filled circles to one another, respectively, and the unfilled/filled squares to one another, respectively, based on the drawing method of the heretofore known Bezier curve as disclosed in Patent Document 2, for example.

As shown in FIG. 15, a closest node accessible within 20 minutes may be highly likely to be closer in a straight line to the position of the user's vehicle than a farthest node accessible within 10 minutes is, depending on the configuration of the road network and the occurrence state of traffic congestion. In this case, the isochronal zones are represented by a gradation. More specifically, when the area between the closed curve 117 and the closed curve 119 is drawn in red (RGB=255, 0, 0) and the area between the closed curve 118 and the closed curve 120 is drawn in blue (RGB=0, 0, 255), the area between the closed curve 118 and the closed curve 119 may be drawn in purple (RGB=127, 0, 127), which is the color between red and blue. Thus, it is possible to successively draw a plurality of isochronal zones such as those of 10-minute travel time and 20-minute travel time.

Figure 16:
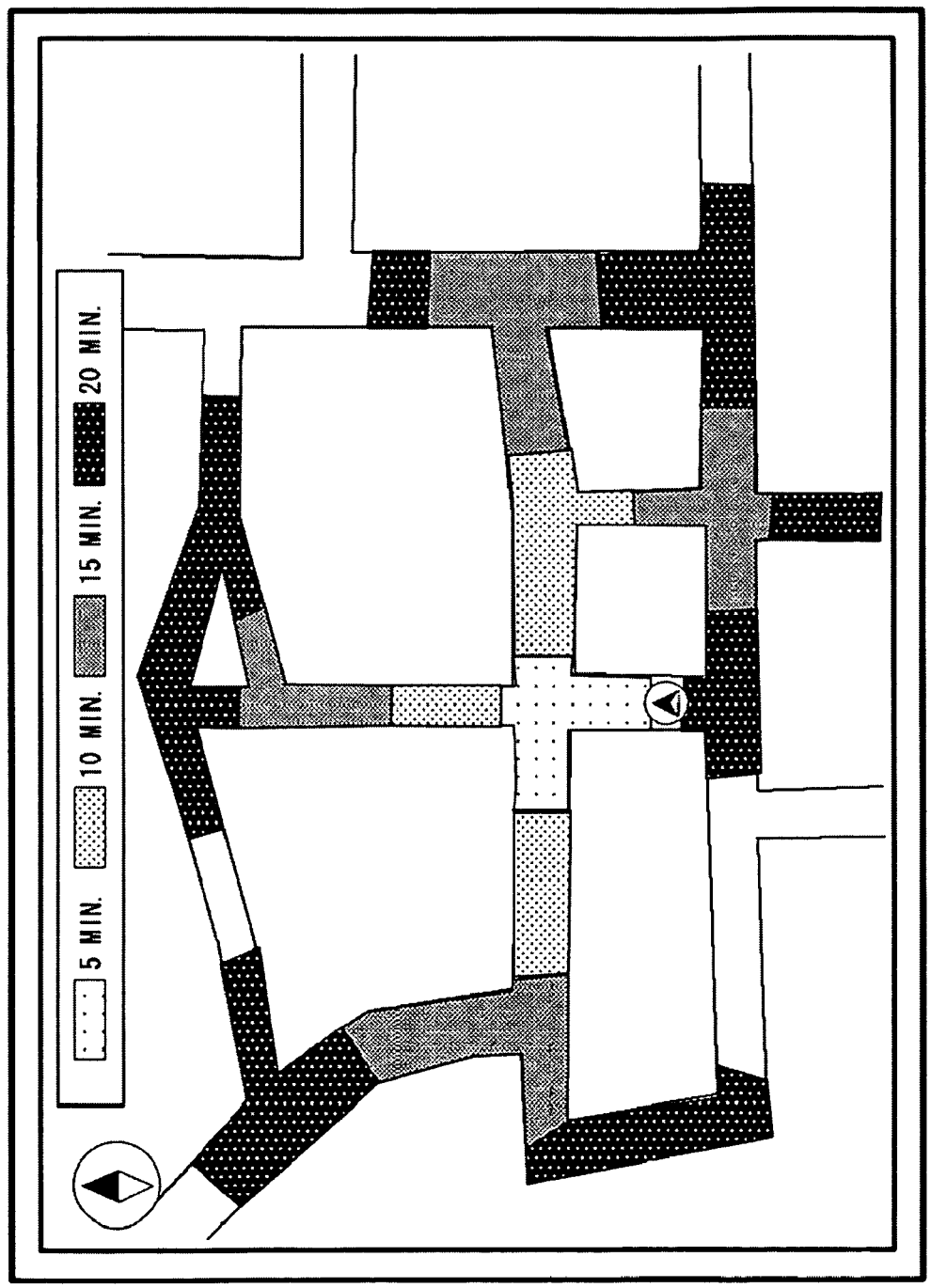
FIG. 16 is a diagram showing a state where roads vary in display form determined in accordance with travel times.

FIG. 16 is a schematic diagram showing an example of the drawing style (3) where roads (links) are drawn by varying the colors and the patterns thereof in accordance with the range of the travel times from the reference point. As shown in FIG. 16, the time information drawing means 109 draws the roads by varying the colors and the patterns thereof in accordance with the range of the travel times (e.g., the range accessible within 5 minutes, the range accessible within 5 to 10 minutes) to access the roads, without drawing isochronal lines nor isochronal zones. Further, the time information drawing means 109 may draw landmarks displayed on the map, by varying the colors and the patterns thereof.

Figure 17:
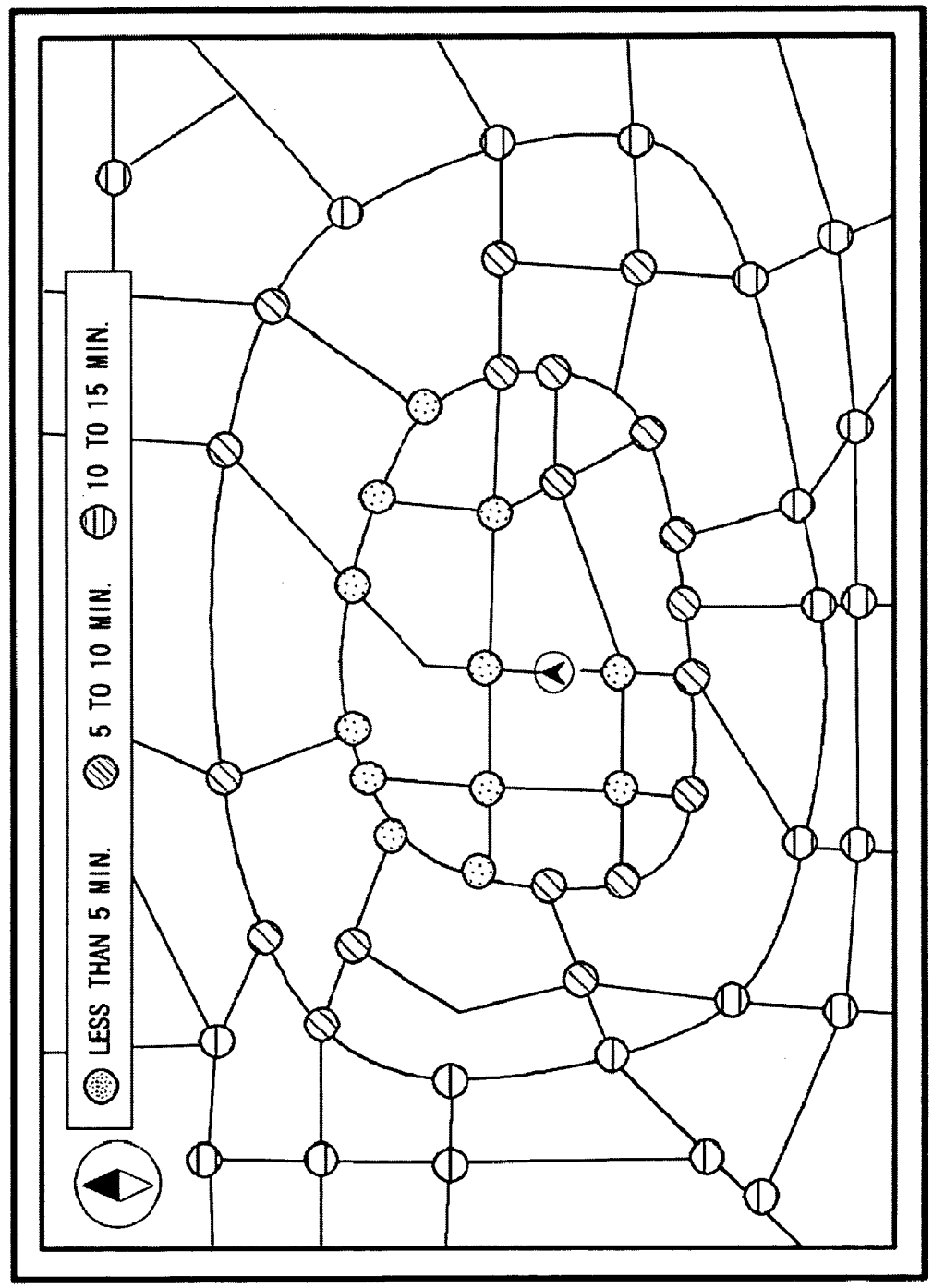
FIG. 17 is a diagram showing a state where intersections vary in display form determined in accordance with travel times.

FIG. 17 is a schematic diagram showing an example of the drawing style (3) where intersections (nodes) are drawn by varying the colors and the patterns thereof in accordance with the range of the travel times from the reference point. As shown in FIG. 17, the time information drawing means 109 draws the intersections by varying the colors and the patterns thereof in accordance with the range of the travel times (e.g., the range accessible within 5 minutes, the range accessible within 5 to 10 minutes) to access the intersections, without drawing isochronal lines nor isochronal zones. Further, the time information drawing means 109 may draw landmarks displayed on the map, by varying the colors and the patterns thereof. Furthermore, the time information drawing means 109 may obtain the isochronal lines of the drawing style (1) by determining, based on image processing performed for the intersections represented by varying the colors and the patterns thereof, the boundaries between the colors and the boundaries between the patterns.

Although the function, performed by the time information drawing means 109, of determining a drawing style of the travel time information and of displaying the determined drawing style with the map information on the display means 105 is described above, the drawing styles (1) through (3) may be used in a combined manner. For example, roads may be drawn by varying the colors thereof in accordance with the travel times, while isochronal lines and isochronal zones may be drawn for landmarks.

Further, it is possible to draw the travel time information more simply in the above-described manner than to draw the travel time information by representing traffic information as a local collection of arrows in a conventional manner, and therefore is possible to avoid the user's confusion. Thus, it is safe to view the travel times (traffic information) while driving.

Next, with reference to FIGS. 18 through 20, the function, performed by the time information drawing means 109, of controlling a display form in accordance with the scale and the vehicle speed so as to improve the visibility of the displayed travel time information will be described taking isochronal lines as an example.

Figure 18:
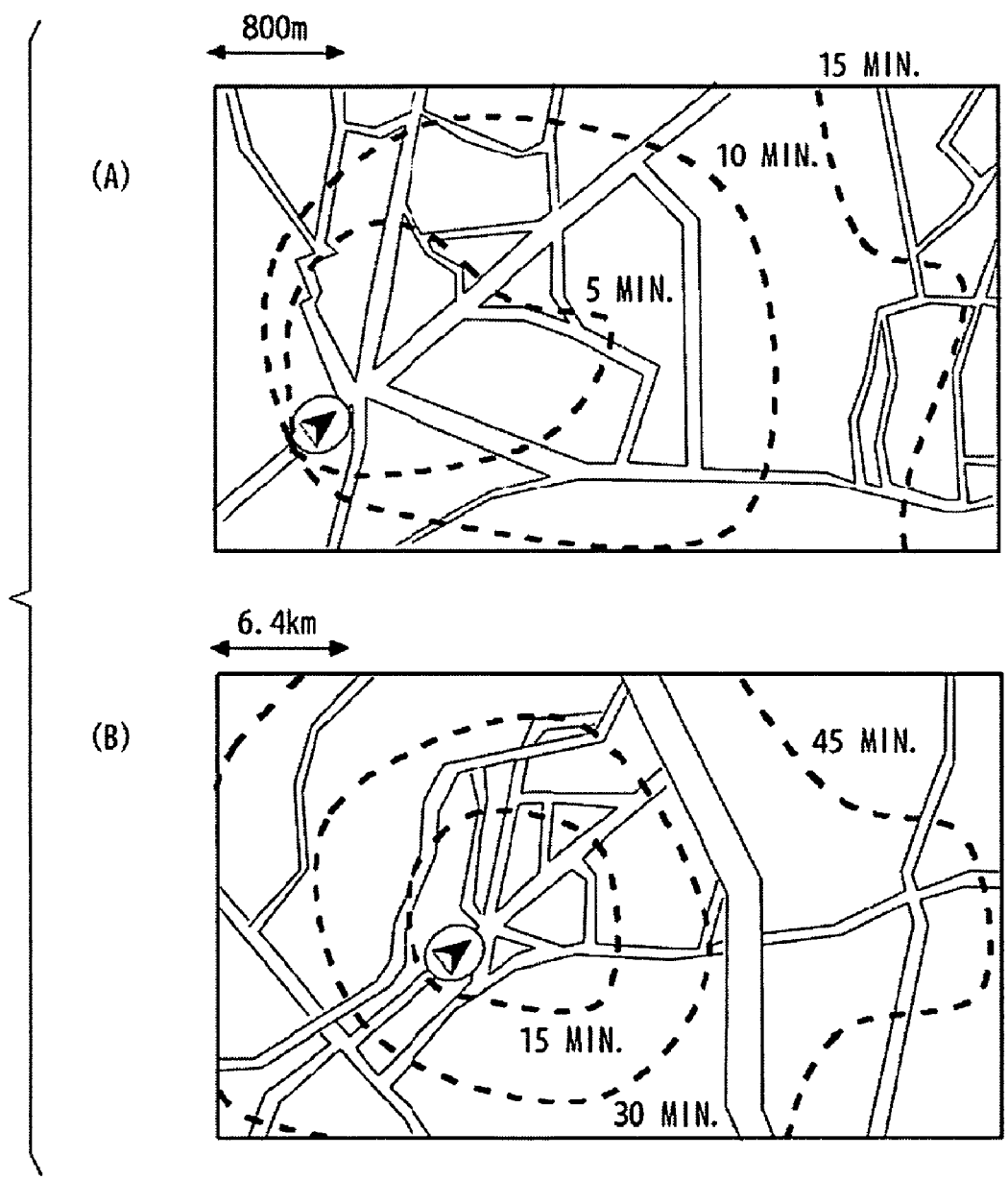
FIG. 18 is: (A) a diagram showing travel times indicated by isochronal lines of a detailed map; and (B) a diagram showing travel times indicated by isochronal lines of a wide-area map.

FIG. 18 is a schematic diagram showing a state where the intervals between the travel times indicated by isochronal lines are changed in accordance with the scale of a displayed map. When a detailed map having a large scale (the scale of 800 m in the figure) is displayed as shown in (A) of FIG. 18, the travel times to points provided within the displayed ranges are short, and therefore isochronal lines are drawn to indicate 5-minute intervals. In contrast, when a wide-area map having a small scale (the scale of 6.4 km in the figure) is displayed as shown in (B) of FIG. 18, the travel times are long, and therefore isochronal lines are drawn to indicate 15-minute intervals. The reason is that since a large number of isochronal lines would be required to be drawn if drawn to indicate 5-minute intervals, the visibility would be low. The intervals between the travel times indicated by the isochronal lines may be changed depending on the scale as described above, and thus it is possible to draw appropriate isochronal lines determined in accordance with the displayed area.

Figure 19:
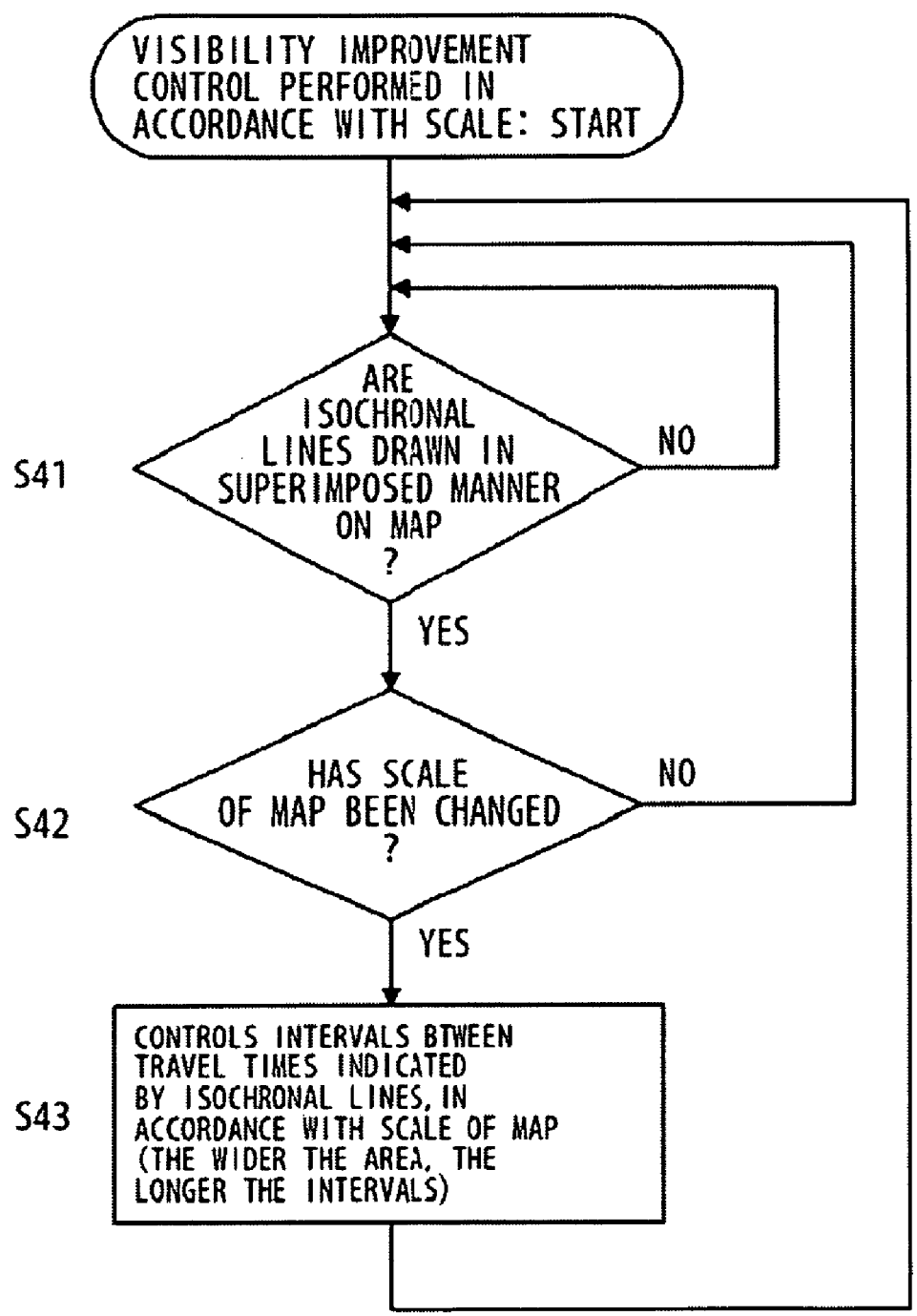
FIG. 19 is a flow chart showing an operation of controlling a display form in accordance with the scale so as to improve the visibility of displayed travel time information.

FIG. 19 is a flow chart showing an operation, illustrated in FIG. 18, of controlling a display form in accordance with the scale so as to improve the visibility of the displayed travel time information. In FIG. 19, first, the time information drawing means 109 determines whether or not isochronal lines are drawn in a superimposed manner on the map (step S41). When the isochronal lines are not drawn in a superimposed manner on the map (step S41: "No"), the time information drawing means 109 returns to prior to step S41. When the isochronal lines are drawn in a superimposed manner on the map (step S41: "Yes"), the time information drawing means 109 proceeds to step S42. In step S42, the time information drawing means 109 determines whether or not the scale of the map has been changed. When the scale of the map has not been changed (step S42: "No"), the time information drawing means 109 returns to prior to step S41. When the scale of the map has been changed (step S42: "Yes"), the time information drawing means 109 proceeds to step S43. In step S43, the time information drawing means 109 controls the intervals between the travel times indicated by the isochronal lines (the wider the area, the longer the intervals). Note that although in FIGS. 18 and 19, described is interval control of the isochronal lines which is performed when the scale is changed by the user, the present invention is not limited thereto. The number of isochronal lines displayed on one screen may be a constant number (e.g., three) and the scale may be automatically changed such that all of the constant number of the isochronal lines are included in the one screen. Further, even when the scale is of the same, the intervals between the travel times may be changed in accordance with the vehicle speed or with the degree of traffic congestion.

Figure 20:
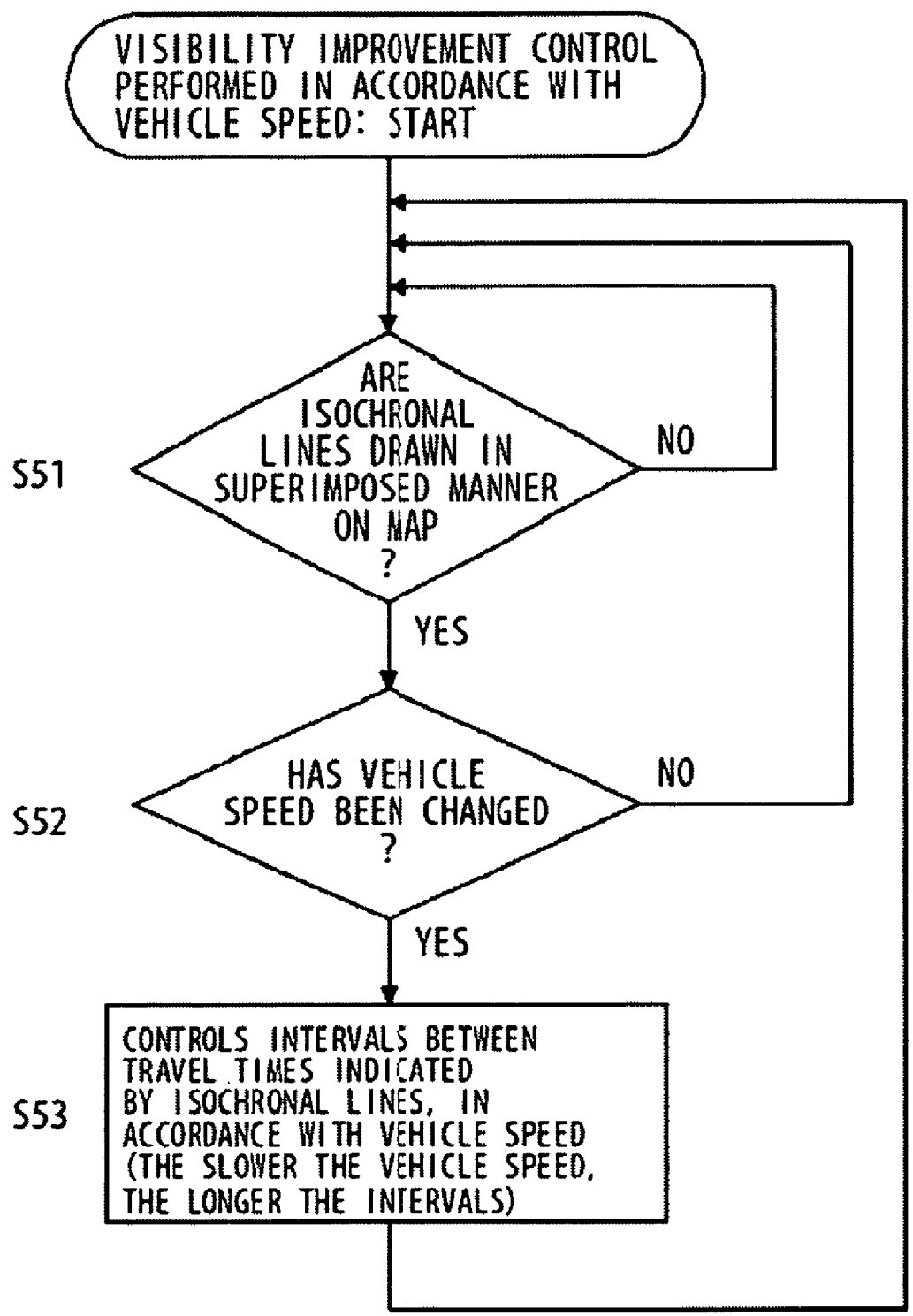
FIG. 20 is a flow chart showing an operation of controlling a display form in accordance with the vehicle speed even when the scale is of the same, so as to improve the visibility of displayed travel time information.

FIG. 20 is a flow chart showing an operation of controlling, even when the scale is of the same, a display form in accordance with the vehicle speed so as to improve the visibility of the displayed travel time information. In FIG. 20, first, the time information drawing means 109 determines whether or not isochronal lines are drawn in a superimposed manner on the map (step S51). When the isochronal lines are not drawn in a superimposed manner on the map (step S51: "No"), the time information drawing means 109 returns to prior to step S51. When the isochronal lines are drawn in a superimposed manner on the map (step S51: "Yes"), the time information drawing means 109 proceeds to step S52. In step S52, the time information drawing means 109 determines whether or not the vehicle speed acquired by the position determining means 103 has been changed. When the vehicle speed has not been changed (step S52: "No"), the time information drawing means 109 returns to prior to step S51. When the vehicle speed has been changed (step S52: "Yes"), the time information drawing means 109 proceeds to step S53. In step S53, the time information drawing means 109 controls the intervals between the travel times indicated by the isochronal lines in accordance with the vehicle speed (the slower the vehicle speed, the longer the intervals). The reason for the above control will be described. Take for example the travel times to points provided within the map range displayed at some point in time: when the vehicle speed is slow due to traffic congestion or the like, it takes longer times to access the points than it does at the ordinary vehicle speed. And since more isochronal lines would be drawn in the case of traffic congestion or the like if the intervals between the travel times indicated by isochronal lines were constant, the visibility would be low. In contrast, it may be set that the faster the vehicle speed, the shorter the intervals, and thus it is possible to appropriately control the number of isochronal lines to be drawn.

Next, with reference to FIGS. 21 and 22, the function, performed by the time information drawing means 109, of performing a drawing effect will be described taking isochronal lines as an example.

Figure 21:
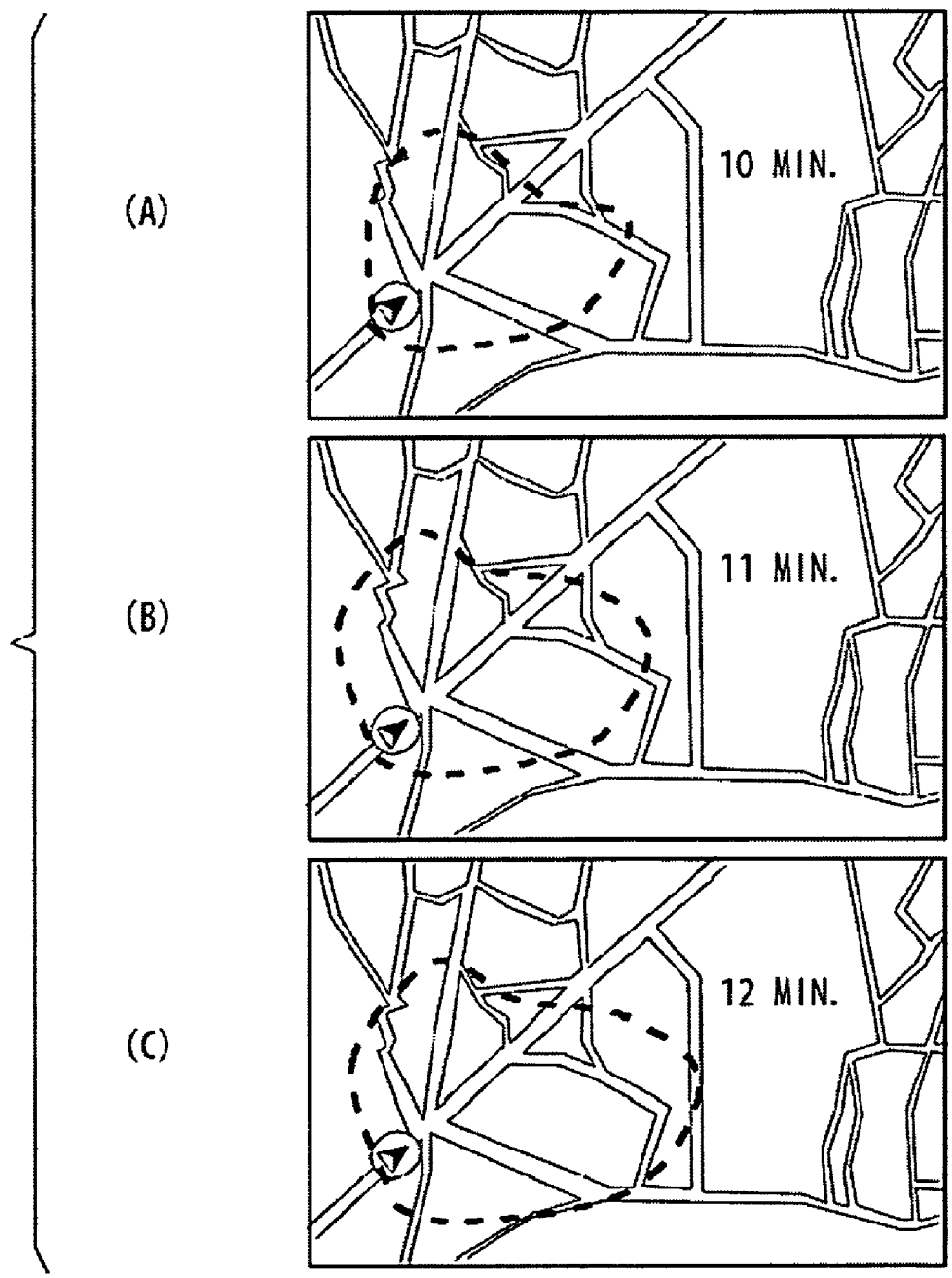
FIG. 21 is: (A) a diagram showing a state where an isochronal line of 10-minute travel time is displayed; (B) a diagram showing a state where the isochronal line of 10-minute travel time is erased and an isochronal line of 11-minute travel time is displayed; and (C) a diagram showing a state where the isochronal line of 11-minute travel time is erased and an isochronal line of 12-minute travel time is displayed.

FIG. 21 is an example where isochronal lines to be drawn are sequentially changed so as to radiate from an isochronal line of the shorter travel time to an isochronal line of the longer travel time. In FIGS. 12 and 18, only the isochronal lines of the discrete travel times (e.g., 10-minute travel time, 15-minute travel time) can be drawn, since the isochronal lines are statically drawn (the reason is that since the density of the isochronal lines would be high if the isochronal lines were successively drawn, the visibility would be low). However, as shown in FIG. 21, isochronal lines may be drawn to radiate by sequentially stopping the isochronal lines of the shorter travel times from being displayed, and thus it is possible to display the isochronal lines of a successive and small unit, such as 10-minute travel time, 11-minute travel time, and 12-minute travel time, in an easily understandable manner. Further, the isochronal lines sequentially drawn may appeal to the eye of the user, and consequently, the isochronal lines can also be highlighted. Furthermore, when the isochronal lines sequentially changed so as to radiate have radiated outside the map having the current scale, the scale may be switched to that of a wider area.

Figure 22:
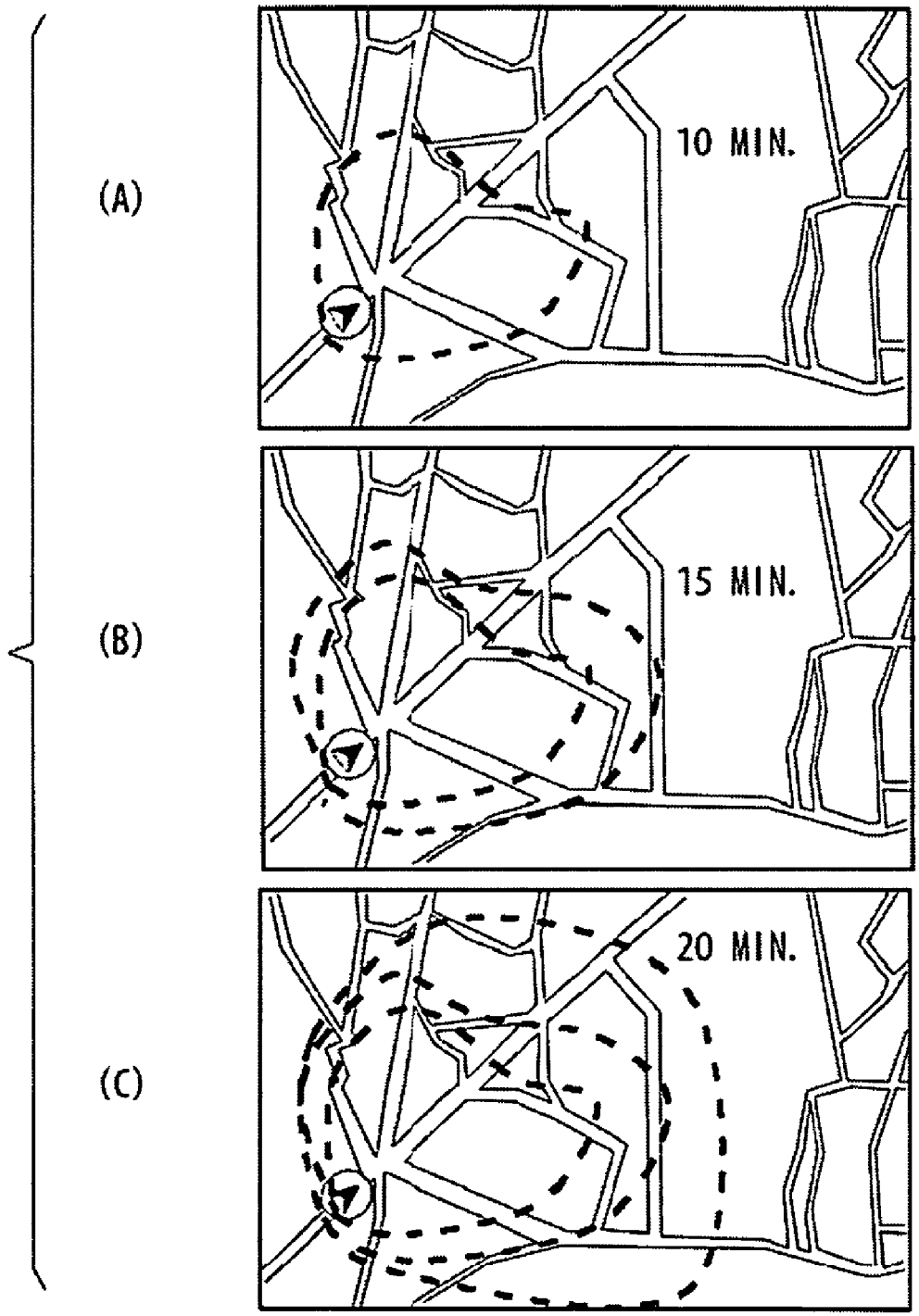
FIG. 22 is: (A) a diagram showing a state where an isochronal line of 10-minute travel time is displayed; (B) a diagram showing a state where an isochronal line of 15-minute travel time is additionally displayed without erasing the isochronal line of 10-minute travel time; and (C) a diagram showing a state where an isochronal line of 20-minute travel time is additionally displayed without erasing either of the isochronal lines of 10-minute travel time nor 15-minute travel time.

Further, as shown in FIG. 22, isochronal lines of the longer travel times may be sequentially drawn while isochronal lines of the shorter travel times remain displayed. Alternatively, isochronal lines may be displayed by setting a standard that the difference between the shortest and longest travel times indicated by isochronal lines is less than a certain value (when the difference is set as 10 minutes, if the isochronal lines of 5-minute travel time, 10-minute travel time, and 15-minute travel time are drawn at certain timing, the isochronal lines of 10-minute travel time, 15-minute travel time, and 20-minute travel time are drawn at the next timing).

Further, isochronal lines may be drawn using colors (5-minute travel time in blue, 10-minute travel time in yellow, 15-minute travel time in red, etc.) different from one another and patterns (a solid line, a dashed line, a chain line, etc.) different from one another. Furthermore, when a plurality of isochronal lines are displayed, the thicknesses of each several isochronal lines thereof may be changed.

Further, a drawing effect may be performed for a map area displayed within a predetermined isochronal line in a different manner than that performed for a map area displayed outside the predetermined isochronal line. For example, in display as shown in FIG. 12, the outer map area provided outside the outermost isochronal line, which is of 20-minute travel time, may be filled in white or black or may be applied with a transparent texture, so as to be more difficult to view than the inner map area is. That is, the user can pay attention to the inner map area. Note that the above-described process may be performed not for the outermost isochronal line but for another arbitrary isochronal line.

Although the function, performed by the time information drawing means 109, of performing a drawing effect is described above, the drawing styles (1) through (3) and the drawing effect may be used in a combined manner.

Next, with reference to FIG. 23, the function, performed by the time information drawing means 109, of changing, when receiving from the user an instruction to change a travel time, the travel time to an arbitrary travel time will be described.

FIG. 23 is a schematic diagram showing the function of changing, when receiving from the user an instruction to change a travel time, the travel time to an arbitrary travel time. In FIG. 23, the display means 105 includes an input function such as a touch panel, such that an isochronal line displayed thereon can be operated by the user and an isochronal line of an arbitrary travel time can be displayed in response thereto.

(A) and (B) of FIG. 23 show an example where a displayed isochronal line of 10-minute travel time is pressed and then slid remaining pressed, and then indicates 15-minute travel time. It is to be understood that the isochronal line may be drawn to indicate the travel time of between 10 minutes and 15 minutes, such that the isochronal lines of the travel times are successively drawn at arbitrary positions pressed by the user. Note that an effect of changing, when an isochronal line is pressed by the user, the color of the isochronal line to the color of response, and the like may be performed.

Further, in (C) and (D) of FIG. 23, a slider bar is displayed on a screen, such that a slider thereof is moved left and right by the user, whereby an isochronal line of an arbitrary travel time can be drawn. Note that when the slider bar is displayed in an up/down direction in a longitudinal manner, the slider may be moved up and down. A predetermined travel time may be instructed by an input through a remote control and the like, as well as by an input through the touch panel as described above.

Further, the scale of the range within a selected isochronal line may be changeable. For example, the map may be reduced when the user presses an isochronal line and moves his/her finger in a direction of the search start position (the position of the user's vehicle in an example as shown in FIG. 23), while the map may be enlarged when the user moves his/her finger in the opposite direction.

Figure 24:
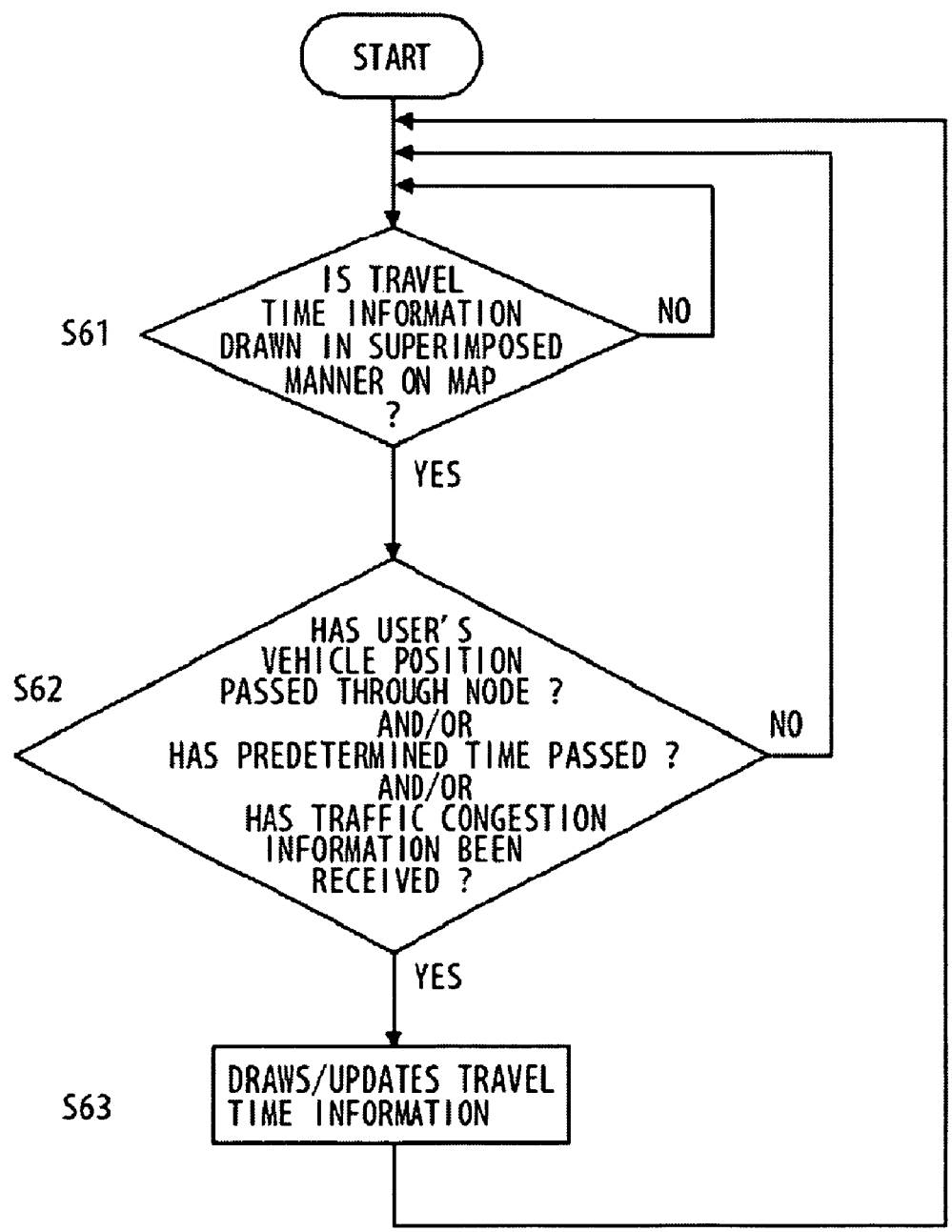
FIG. 24 is a flow chart showing an operation, performed by time information drawing means 109, of drawing/updating travel time information.

Next, with reference to FIG. 24, the function, performed by the time information drawing means 109, of drawing/updating the travel time information will be described. FIG. 24 is a flow chart showing an operation, performed by the time information drawing means 109, of drawing/updating the travel time information.

In FIG. 24, first, the time information drawing means 109 determines whether or not the travel time information is drawn in a superimposed manner on the map (step S61). When the travel time information is not drawn in a superimposed manner on the map (step S61: "No"), the time information drawing means 109 returns to prior to step S61. When the travel time information is drawn (step S61: "Yes"), the time information drawing means 109 proceeds to step S62. In step S62, the time information drawing means 109 determines whether or not the position of the user's vehicle has passed through a node, whether or not a predetermined time (e.g., 1 minute) has passed, and/or whether or not the traffic congestion information has been received. When the determination made in step S62 indicates "false" (step S62: "No"), the time information drawing means 109 returns to prior to step S61. When the determination made in step S62 indicates "true" (step S62: "Yes"), the time information drawing means 109 draws/updates the travel time information (step S63).

Further, the time interval of drawing/updating the travel time information may vary depending on the scale of a map. For example, the update time interval may be short in a detailed map having a large scale, since a change, based on the movement of the user's vehicle, of an apparent position of the user's vehicle is large on the display means 105. And the update time interval may be long in a wide-area map having a small scale, since a change, based on the movement of the user's vehicle, of an apparent position of the user's vehicle is small on the display means 105.

Figure 25:
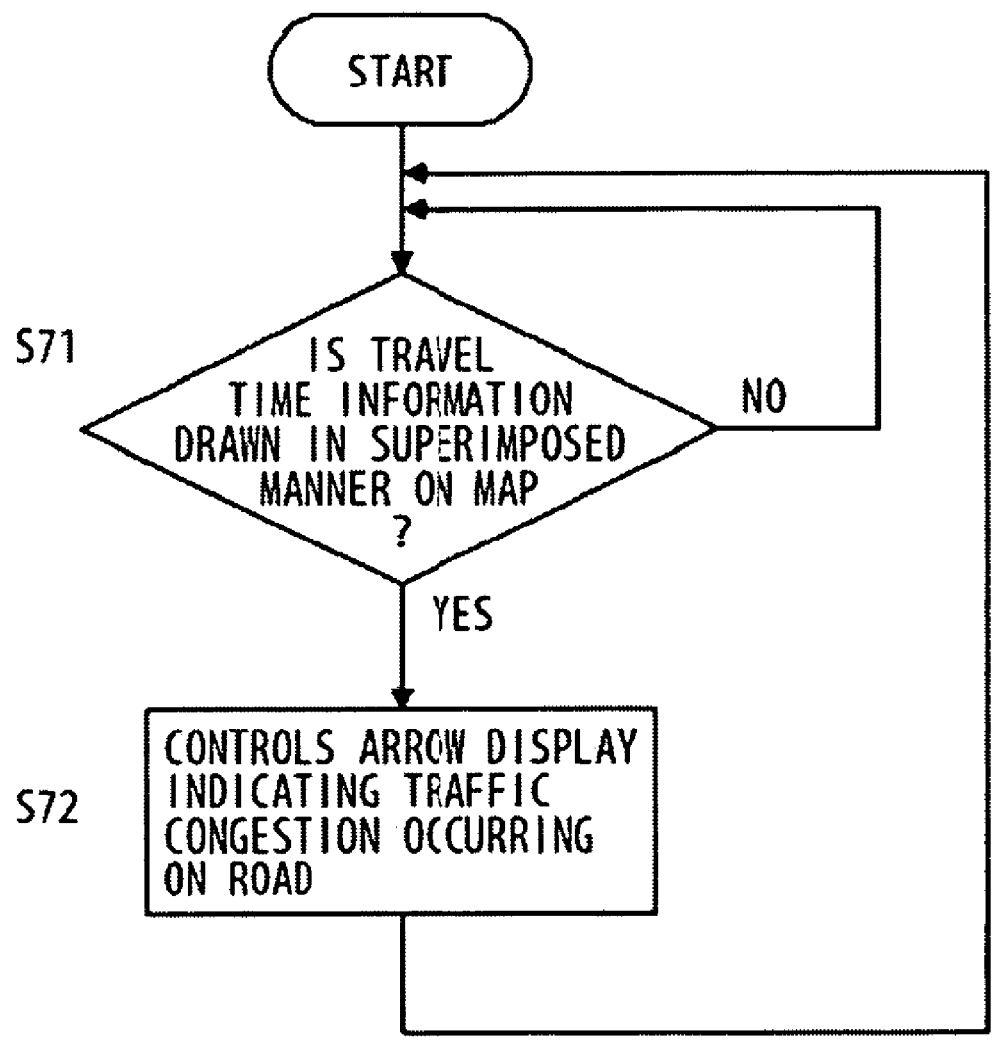
FIG. 25 is a flow chart showing an operation, performed by the time information drawing means 109, of controlling arrow display indicating traffic congestion occurring on a road.

Next, with reference to FIG. 25, the function, performed by the time information drawing means 109, of controlling arrow display indicating traffic congestion occurring on a road will be described. FIG. 25 is a flow chart showing an operation, performed by the time information drawing means 109, of controlling arrow display indicating traffic congestion occurring on a road.

In FIG. 25, first, the time information drawing means 109 determines whether or not the travel time information is drawn in a superimposed manner on the map (step S71). When the travel time information is not drawn in a superimposed manner on the map (step S71: "No"), the time information drawing means 109 returns to prior to step S71. When the travel time information is drawn in a superimposed manner on the map (step S71: "Yes"), the time information drawing means 109 proceeds to step S72. In step S72, the time information drawing means 109 controls arrow display indicating traffic congestion occurring on a road. Thus, it is possible to display the travel times in lieu of displaying traffic information in a conventional manner. It is possible to prevent a map displayed on a display screen from being complicated and disorganized, particularly when detailed traffic information including narrow streets is available.

Next, with reference to FIG. 26, a function, performed by the time information drawing means 109, of displaying the travel time information in a radiating manner and of also displaying a recommended POI which is present in an isochronal zone indicated by the travel time information will be described. Note that it is assumed in this case that the temporally closer the recommended POI is to the current position, the higher the recommendation level of the recommended POI is.

Figure 26:
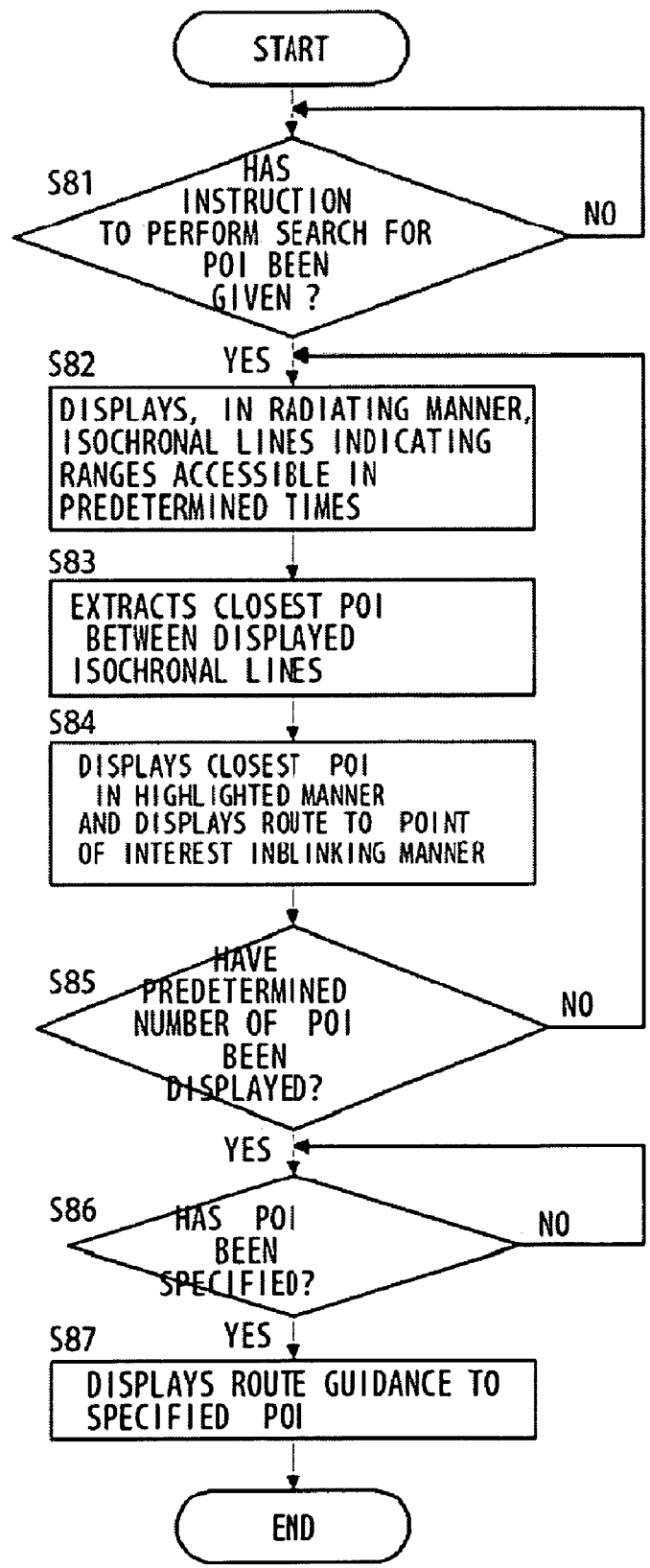
FIG. 26 is a flow chart showing an operation, performed by the time information drawing means 109, of displaying travel time information in a radiating manner and also displaying a POI which is present between isochronal lines indicated by the travel time information and which is temporally closest to the current position.

FIG. 26 is a flow chart showing an operation, performed by the time information drawing means 109, of displaying the travel time information in a radiating manner and of also displaying a recommended POI which is present in an isochronal zone indicated by the travel time information and which is temporally closest to the current position.

In FIG. 26, first, the time information drawing means 109 determines whether or not an instruction to perform a search for a POI has been given (step S81). When the instruction has not been given (step S81: "No"), the time information drawing means 109 returns to step S81. When the instruction has been given (step S81: "Yes"), the time information drawing means 109 proceeds to step S82. In step S82, the time information drawing means 109 displays, in a radiating manner, isochronal zones each indicating the range accessible in a predetermined time.

Figure 27:
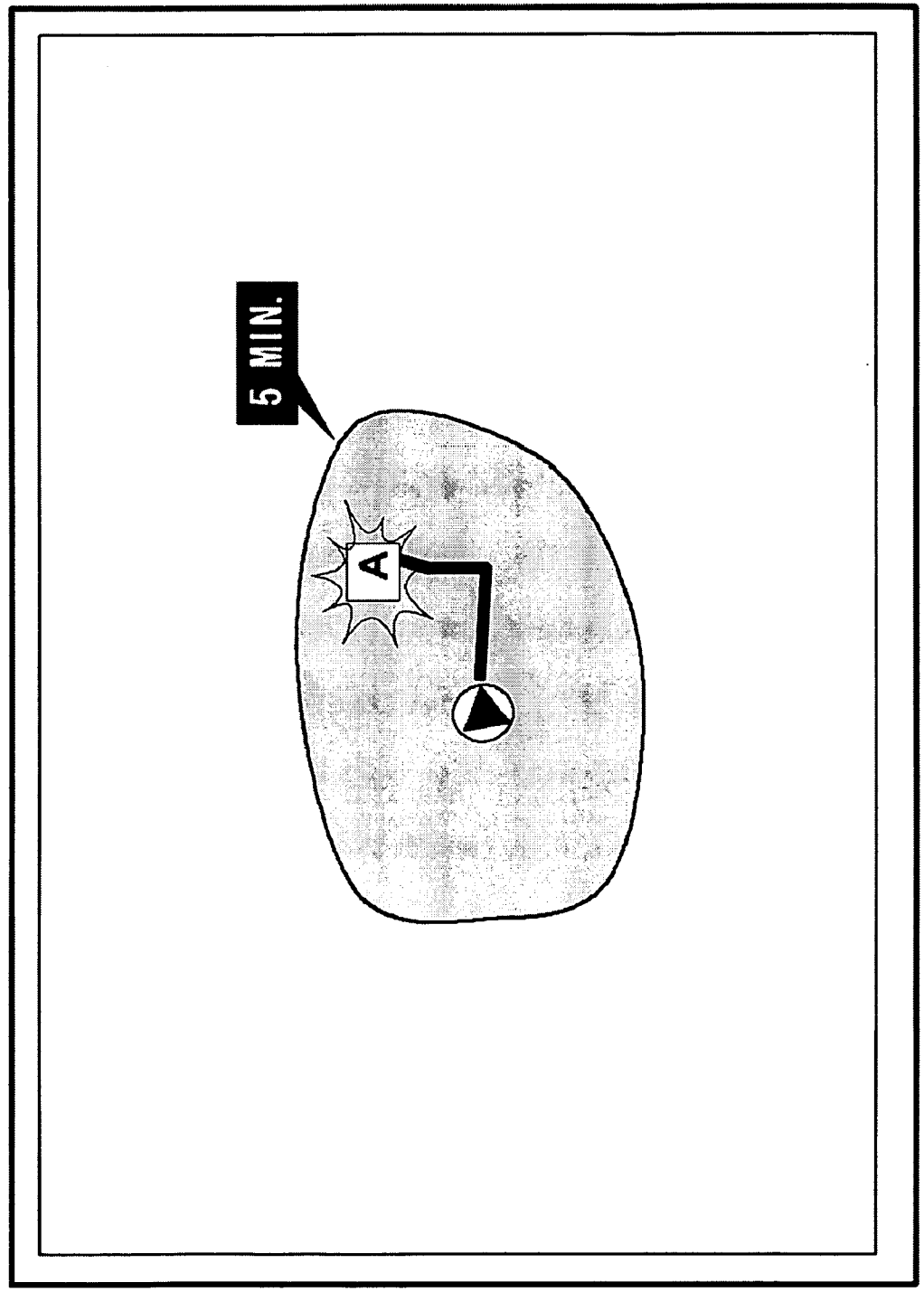
FIG. 27 is a diagram showing a state where travel time information is displayed in a radiating manner and a POI which is present between isochronal lines indicated by the travel time information and which is temporally closest to the current position, is also displayed.
Figure 28:
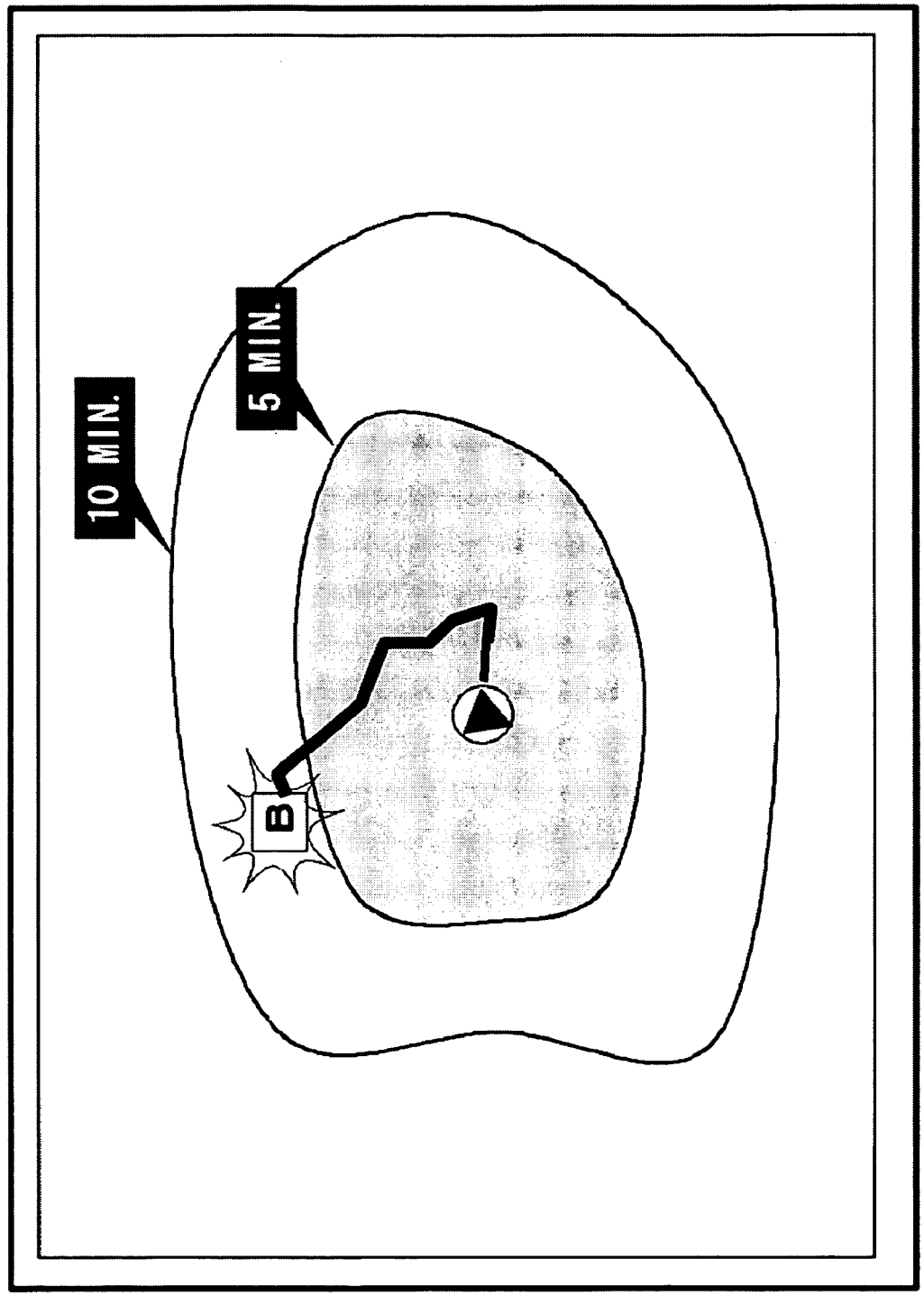
FIG. 28 is a diagram showing a state where travel time information is displayed in a radiating manner and a POI which is present between isochronal lines indicated by the travel time information and which is temporally closest to the current position, is also displayed.
Figure 29:
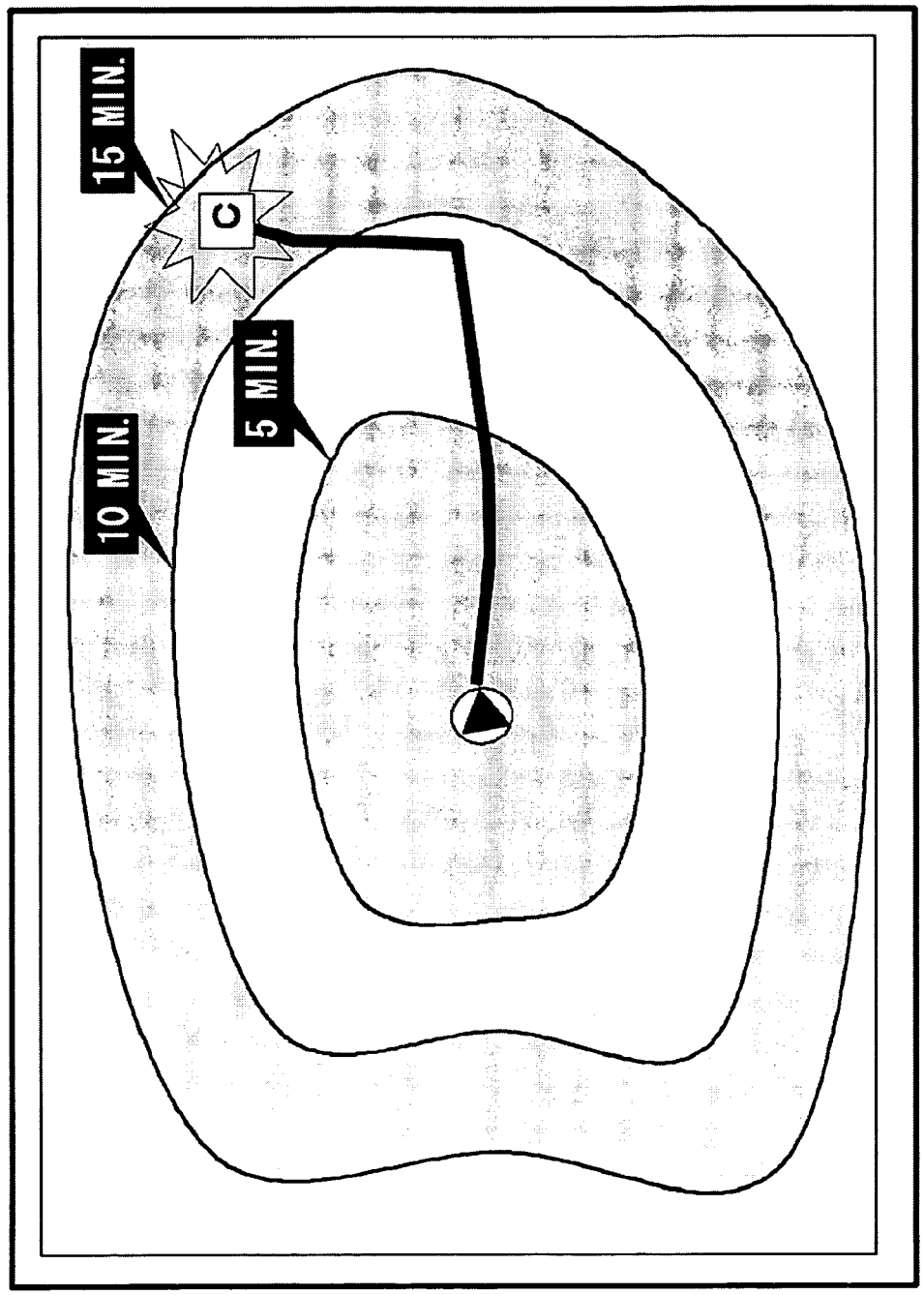
FIG. 29 is a diagram showing a state where travel time information is displayed in a radiating manner and a POI which is present between isochronal lines indicated by the travel time information and which is temporally closest to the current position, is also displayed.
Figure 30:
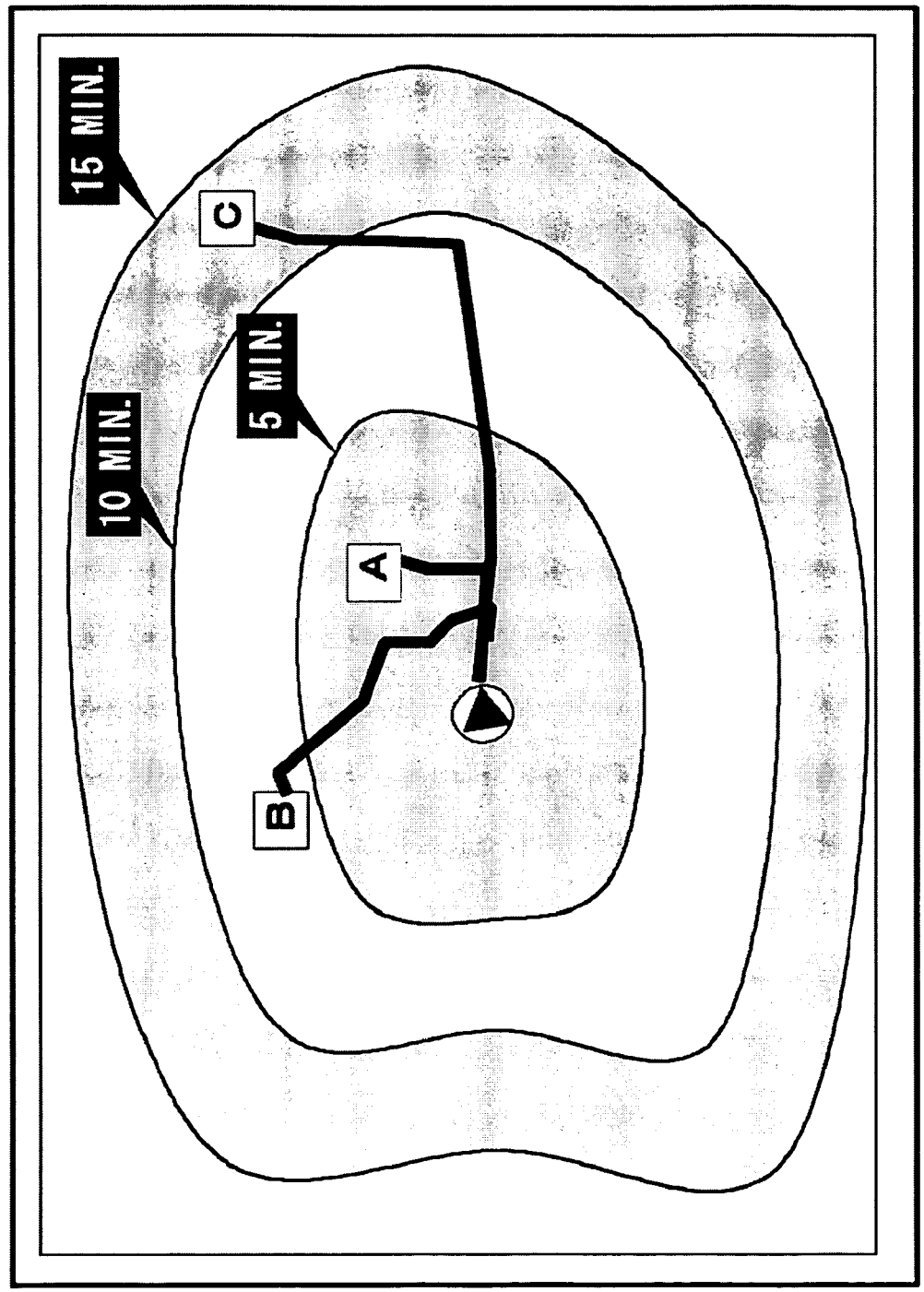
FIG. 30 is a diagram showing a state where travel time information is displayed in a radiating manner and POI each of which is present between isochronal lines indicated by the travel time information and each of which is temporally closest to the current position, are also displayed.

Next, the time information drawing means 109 extracts, from the displayed isochronal zones, the POI temporally closest to the current position (step S83). Further, as shown in FIG. 27, the time information drawing means 109 displays, in a highlighted manner, the POI extracted in step S83 and also displays the route to the POI in a blinking manner (step S84). Next, the time information drawing means 109 determines whether or not a predetermined number of (e.g., three) POI have been displayed (step S85).

When the predetermined number of POI have not been displayed, the time information drawing means 109 returns to step S82 so as to repeat the process of steps S82 through S84. That is, the process is repeated, whereby as shown in FIGS. 27 through 30, first, an isochronal zone accessible in 5 minutes is displayed, a point A which is provided within the isochronal zone indicating the range accessible in 5 minutes and which is temporally closest to the current position is displayed in a highlighted manner, and the route to the point A is displayed in a blinking manner. Next, an isochronal zone indicating the range accessible in 10 minutes is displayed, a point B which is provided within the isochronal zone indicating the range accessible in 5 to 10 minutes and which is temporally closest to the current position is displayed in a highlighted manner, and the route to the point B is displayed in a blinking manner. Next, an isochronal zone accessible in 15 minutes is displayed, a point C which is provided within the isochronal zone indicating the range accessible in 10 to 15 minutes and which is temporally closest to the current position is displayed in a highlighted manner, and the route to the point C is displayed in a blinking manner.

On the other hand, when the predetermined number of POI have been displayed, the time information drawing means 109 determines whether or not an instruction to specify POI has been received from the user (step S86). When the instruction to specify has not been received (step S86: "No"), the time information drawing means 109 waits until an input is received. When the instruction to specify has been received (step S86: "Yes"), the time information drawing means 109 displays a route guidance to the specified POI (step S87).

Note that described is an example where it is assumed that the temporally closer the recommended POI is to the current position, the higher the recommendation level of the recommended POI is, such that the recommended POI are extracted in order of the temporal proximity to the current position. The recommended POI, however, may be extracted in ascending order of evaluation value obtained by performing weighted addition on the distance from the current position, the travel time from the current position, and/or a value obtained by quantifying the direction from the current position. Alternatively, the user's access history of accessing POI may be stored, whereby, with reference to the stored user's access history, the recommended POI may be extracted in descending order of the frequency of accessing a POI.

As described above, based on the present invention, it is possible to provide a map displaying device for displaying an accessible range in an arbitrary display form determined in accordance with the scale of a displayed map and/or with the running state of a vehicle. That is, since the present invention displays, on an ordinary and familiar map, travel time information represented by the travel time to an arbitrary point and the travel time to travel between arbitrary points, in accordance with the scale of a displayed map and with the running state of a vehicle, it is possible to present to a user a geographical distance and a temporal distance in an easily understandable manner.

While the invention has been described in detail, the foregoing description is in all aspects illustrative and not restrictive. It is to be understood that numerous other modifications and variations can be devised without departing from the scope of the invention. Particularly, the map displaying device according to the present invention can also be used as a portable navigation device, a map displaying application displayed on a personal computer, and a car allocation/command system of a taxi, a security company or the like. Further, the map displaying device according to the present invention can also be applied to other traveling objects such as an aircraft, a ship, and a train.

INDUSTRIAL APPLICABILITY

A map displaying device according to the present invention is applicable to any device or system each capable of displaying a map and each of which may include a navigation device, a personal computer, a mobile phone, and a car allocation/command system of a taxi, a security company or the like.

The invention claimed is:

1. A map displaying device comprising:
a display means for displaying map information stored in a map database;
a search means for calculating travel time information regarding a travel time to an arbitrary point accessible from a reference point; and
a time information drawing means for displaying, in a superimposed manner on a map displayed on the display means, the travel time information by varying a display form in accordance with a scale of the map and/or with a running state of a user's vehicle,
wherein the time information drawing means displays, as a zone, the travel time information indicating a range accessible within a certain travel time or within a certain travel time period.

2. The map displaying device according to claim 1, wherein the time information drawing means displays, when displaying a plurality of the zones, the plurality of the zones by a gradation.

3. The map displaying device according to claim 1, wherein the time information drawing means displays the travel time information by drawing a road and/or an intersection in various display forms in accordance with the travel time or a travel time period.

4. The map displaying device according to claim 1, wherein the time information drawing means displays the travel time information by changing an interval between displayed travel times such that the interval becomes longer as the scale of the map becomes wider.

5. The map displaying device according to claim 1, wherein the time information drawing means displays the travel time information by sequentially drawing, in a radiating manner, travel times or travel time periods in accordance with large/small relationships among the travel times or among the travel time periods, respectively.

6. The map displaying device according to claim 1, wherein the time information drawing means displays the travel time information by performing drawing effects different between an inside and an outside of a line indicating a predetermined travel time or of a zone indicating a predetermined travel time period.

* * * * *